United States Patent [19]

Enders

[11] 4,230,517
[45] Oct. 28, 1980

[54] MODULAR TIRE BUILDING MACHINE

[75] Inventor: George E. Enders, Salem, Ohio

[73] Assignee: NRM Corporation, Akron, Ohio

[21] Appl. No.: 886,743

[22] Filed: Mar. 15, 1978

[51] Int. Cl.² ............... B29H 17/20; B29H 17/22; B29H 17/26

[52] U.S. Cl. .................... 156/396; 156/126; 156/403; 156/414; 156/416

[58] Field of Search ........... 156/110 R, 111, 123 R, 156/126–129, 131, 394, 396, 398, 403, 414–420

[56] References Cited

U.S. PATENT DOCUMENTS

| | | | |
|---|---|---|---|
| B 287,275 | 1/1975 | Caretta | 156/416 |
| 3,151,013 | 9/1964 | Nebout | 156/126 |
| 3,740,293 | 6/1973 | Jones et al. | 156/127 |
| 3,865,670 | 2/1975 | Habert | 156/126 |
| 3,944,456 | 3/1976 | Cantarutti | 156/398 |
| 3,950,212 | 4/1976 | Bullmann | 156/131 |
| 3,990,931 | 11/1976 | Lebland et al. | 156/131 |
| 4,039,366 | 8/1977 | Yabe | 156/126 |
| 4,048,002 | 9/1977 | Mallory | 156/131 |
| 4,053,342 | 10/1977 | Appleby et al. | 156/126 |
| 4,093,495 | 6/1978 | Colombari | 156/126 |

*Primary Examiner*—John E. Kittle
*Attorney, Agent, or Firm*—Maky, Renner, Otto & Boisselle

[57] ABSTRACT

A tire building machine comprises a number of modular packages which can be used interchangeably in single stage, or first stage tire component assembly. Some of the modular components are particularly useful in the manufacture of larger or truck type tires but can also be used in the automatic or semi-automatic production of smaller passenger size tires. One of the principal components is a carriage mounted device for transfer of components such as bands or belt and tread assemblies, or finished tires, which also functions as a bead setter and as a retractable two-position idle journal support for the non-driven end of the main shaft of the tire building drum or shaper. The shaft supports a wide variety of shapers or drums for single, first or second stage building. The device is mounted for movement to and from the shaper or drum and includes a support arm which moves in a circular arc to assume and maintain various positions during various periods in the machine cycle. For certain types of shapers, the device provides support and means for automatic removal and replacement of the outboard bead seal flange. A bead setter is supported on the device and is adjustable omnidirectionally to obtain concentricity and squareness and is also adjustable axially for accurate bead placement symmetrically about the axis centerline of the shaper or drum and thus the tire being built. A bead gripper, actuated by fluid power, automatically rotates clear of the bead flippers or apex and clamps the tire bead securely and squarely to ensure accurate bead placement while transferring the tire bead to its selected location. A retractable positive intermediate stop is employed to position the carriage of the device to perform its various functions. A wide variety of arrangements of the components may be employed performing various tire building processes for different types and sizes of tires.

68 Claims, 55 Drawing Figures

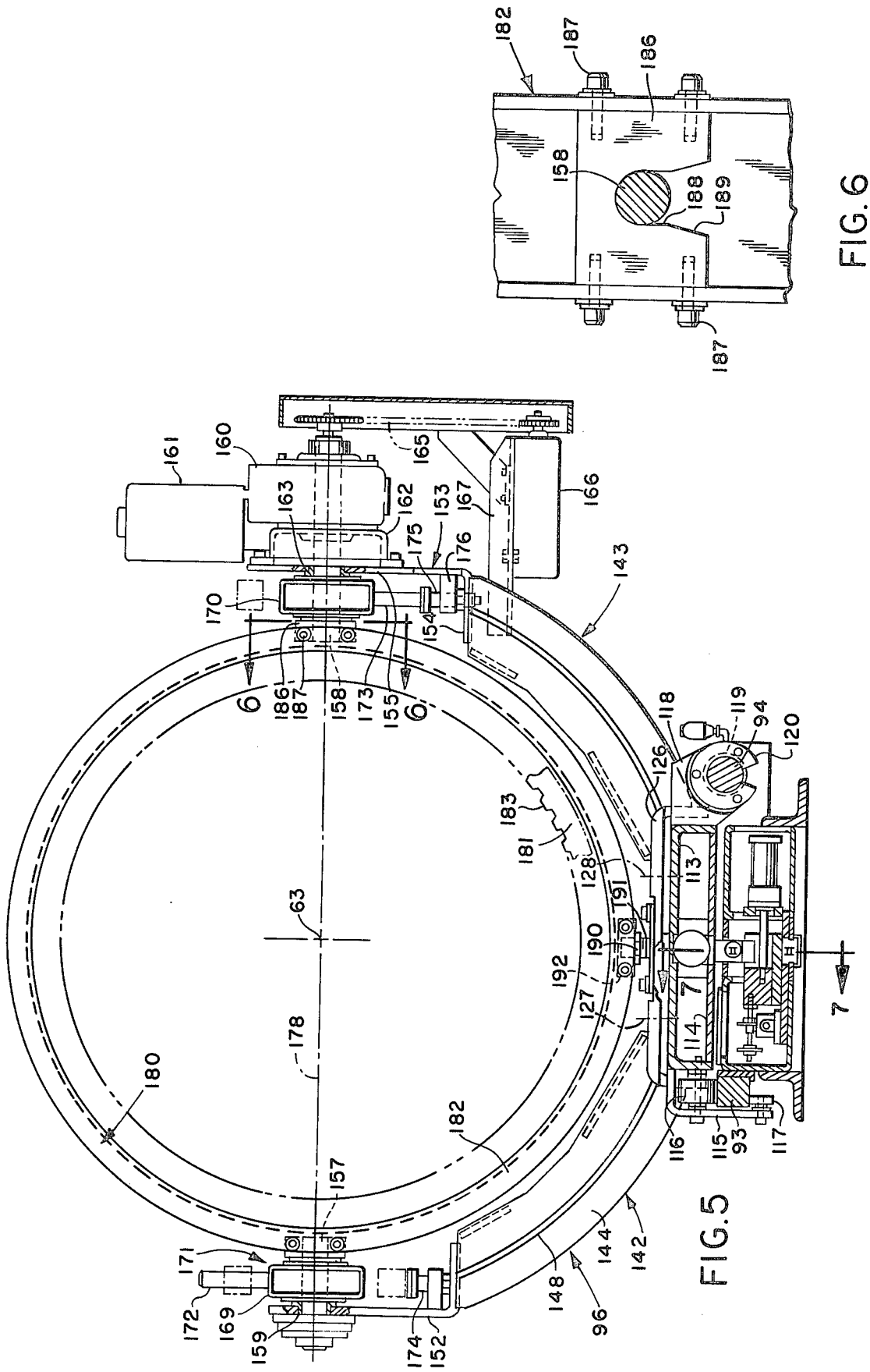

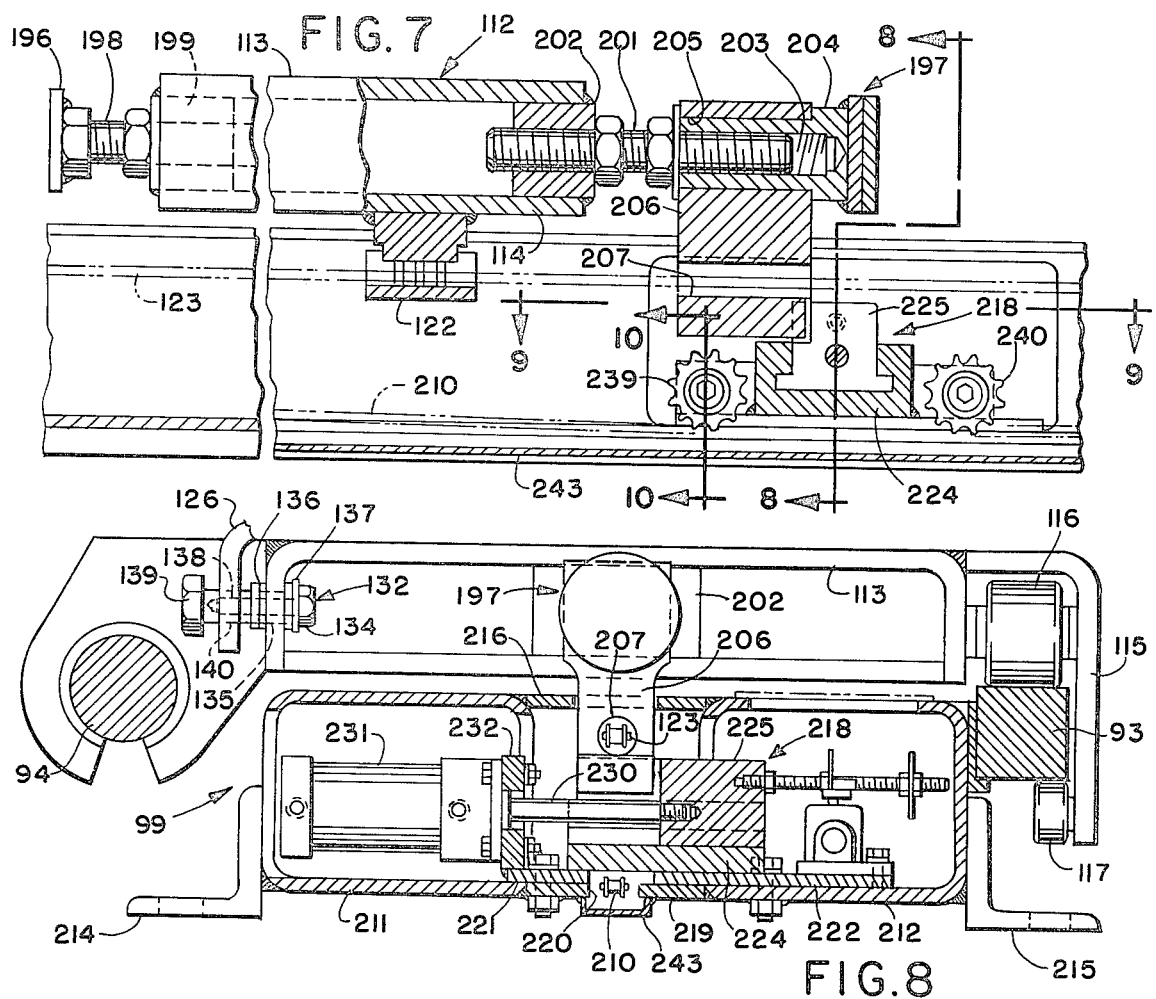
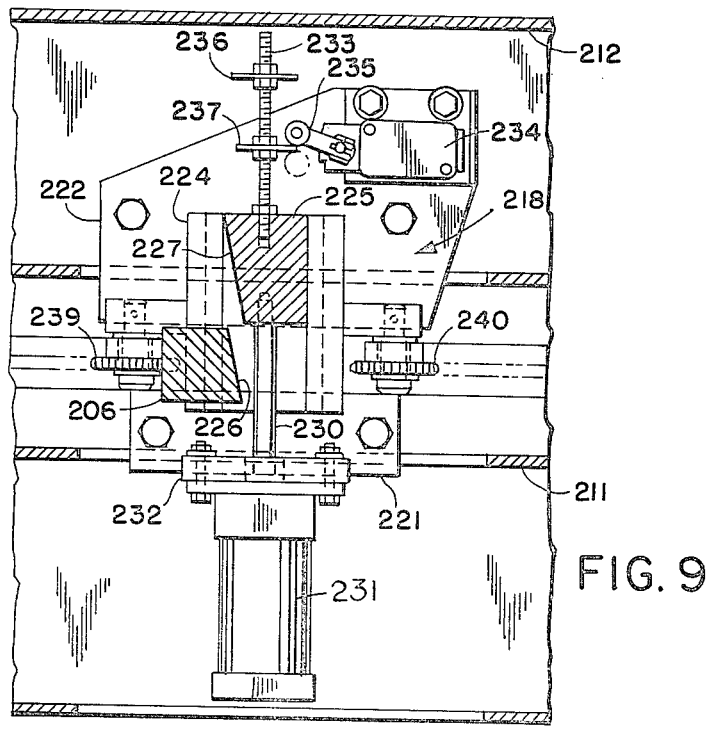
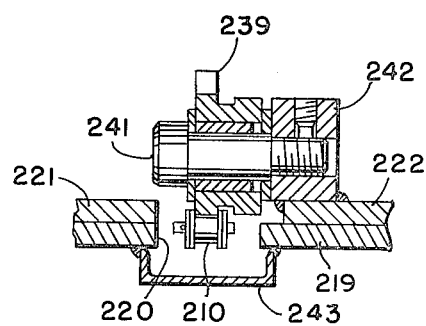

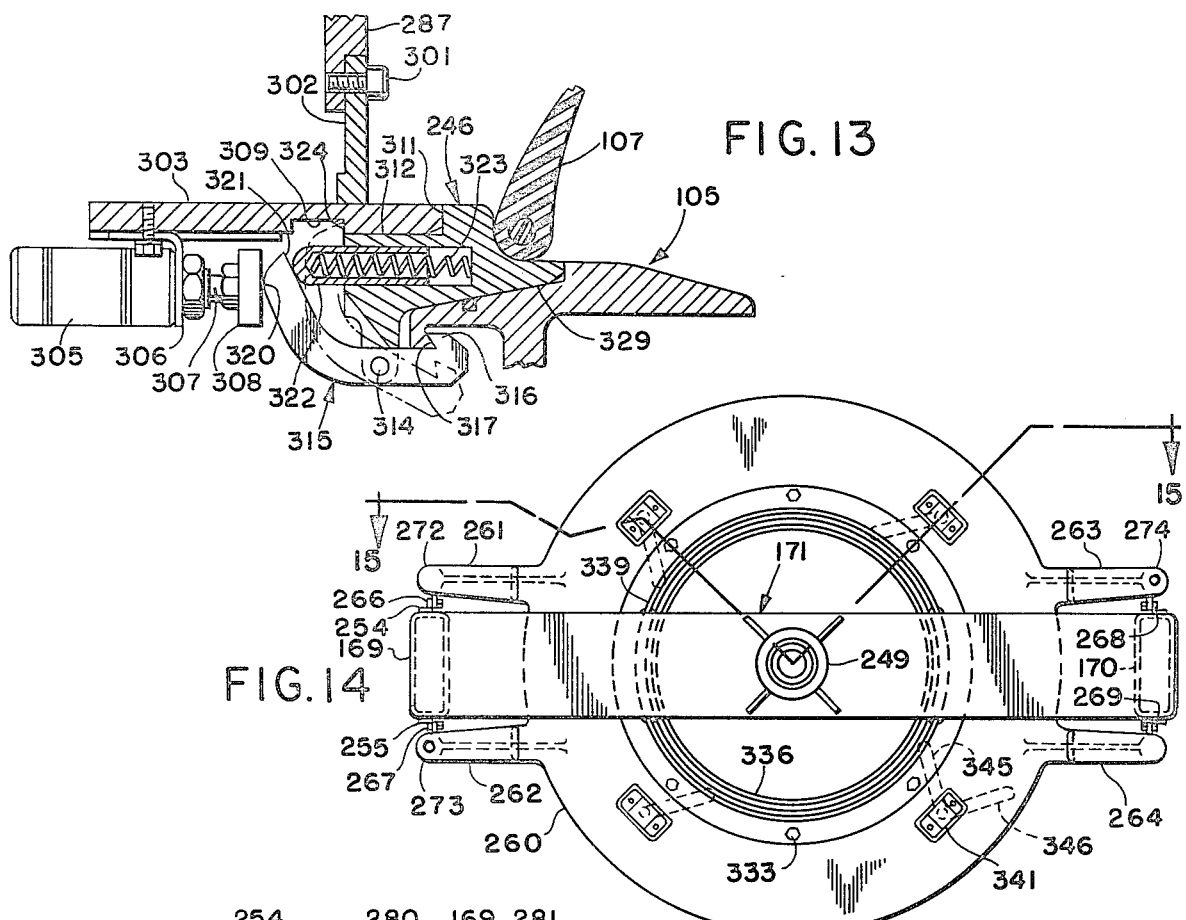
FIG. 13
FIG. 14
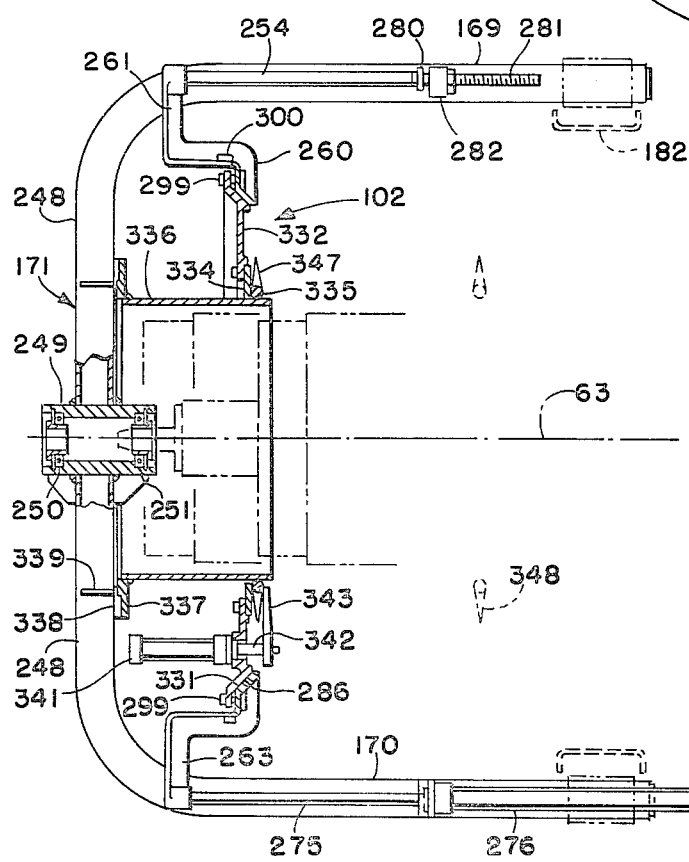
FIG. 15

MODULAR TIRE BUILDING MACHINE

This invention relates generally as indicated to a modular tire building machine and more particularly to a tire building machine which may readily be modularized and employed in single or multi-stage tire building systems.

BACKGROUND OF THE INVENTION

Conventional tire building machines normally employ a retractable tail stock which supports the outboard end of the shaft of the drum or shaper during the tire building process. The tailstock is retractable to permit the finished tire or tire band to be removed from the machine, and also to permit placement of tire components such as beads. Such machines may be seen, for example, in Isaksson et al U.S. Pat. No. 3,524,784 and Jones et al U.S. Pat. No. 3,740,293.

However, many tires today are made in a multi-stage process with components such as belt and tread assemblies or tire bands being made separately and then transferred to a shaping machine for final assembly. Examples of such multi-stage building process may be seen in U.S. Pat. Nos. 3,475,254 and 3,442,746 to Henley and Robertson, respectively.

For smaller size radial tires, the shaft of the shaper need not have an outboard support or journal if properly constructed so as to minimize deflection. Reference may be had to applicant's copending application Ser. No. 814,196 filed July 11, 1977, entitled "Tire Building Machine" for a disclosure of such machine. When an outboard journal or support for the shaft is not required, transfers for components such as belt and tread assemblies may readily be employed. However, in connection with machines for the manufacture of larger size tires such as truck tires, which machines of course employ longer shafts, outboard support during the construction or shaping process is generally required for accuracy.

Moreover, many tire companies employ a variety of processes for manufacture of such tires, larger truck tires being extremely complex and having many parts which must be accurately assembled and shaped. In a first stage machine, a flat pulley band is constructed, and such band may or may not contain the beads. The band is then transferred to the second stage machine for shaping and further assembly. In a second stage machine the flat band or tire carcass may be further constructed and shaped to its toroidal shape for final assembly with components such as the belt and tread assembly and sidewall components. In a single stage machine, first and second stage operations are combined in a single substantially continuous process. Heretofore, first, second, or single stage machines generally employ single use components designed to achieve maximum efficiency for a single application. The components of such machines are not normally interchangeable except perhaps in a relatively narrow tire size range.

Regardless of the process employed, each of the above-described tire building methods nonetheless generally requires an idle journal outboard support for the drum or shaper shaft, in many processes an outboard bead setter, and a transfer, whether it be for moving components such as belt and tread assemblies to the centerline of the shaper, the assembly or removal of bead sealing flanges, or the removal of the finished tire or band. A transfer is particularly desirable in connection with larger tires where the tires, components, or parts are generally larger and heavier and not readily susceptible to manual handling. Automatic transfer of course facilitates centering and concentricity which is extremely important in the construction of radial tires. Further, a transfer which will function automatically during the cycle of the machine frees the operator for supervisory or other tasks increasing the efficiency of the machine and the process.

SUMMARY OF THE INVENTION

The present invention provides a tire building machine wherein the components are modular and interchangeable. A principal component is a carrier or support which has a multiplicity of functions, only some of which are used depending on the modular assembly employed. The carrier functions alternatively or in combination inter alia as a shaft support in one or two positions, as a component transfer, as a bead setter, as a sealing flange remover, or as a tire unloader.

It is accordingly a principal object of the present invention to provide a tire building machine, the principal components of which can be used in a variety of tire building processes.

Another important object is the provision of a tire building machine having modularized components which can readily be set up and assembled to construct tires in a variety of process steps.

An important object is the provision of a tire building machine utilizing a multi-position shaper or drum support which also has a variety of optionally employable functions depending upon the process employed and the components of such process.

It is an object of the present invention to provide such shaper or drum support which also functions as a tire component or tire or band transfer.

Another object is to provide such shaper or drum support which will also incorporate an omnidirectional bead setter and retainer.

Still another object is the provision of such support which may automatically assemble and disassemble a bead sealing flange of a tire shaper.

A further object is the provision of a transfer for a tire building machine which will support the shaft of the machine in at least two selected positions thereof.

Another object is the provision of a tire building machine having an outboard journal or idle journal which is axially reversible supporting the shaft in one or more positions.

Yet another object is the provision of a tire building machine having an idle journal for one end of the shaft of the machine which is movable both axially of the shaft and transversely of the axis of the shaft to clear the path of movement of the support for the journal.

It is also an object of the machine to provide such support and transfer wherein the idle journal for the shaft is hinged to a transfer to be moved through an arc intersecting the axis of the shaft.

Still another important object is the provision of a machine wherein the components can be trued to maintain the desired concentricity and squareness with the axis of the tire being built which is so important in the production of radial or belted tires.

A further important object is the provision of a machine wherein the same components may be assembled in a variety of arrangements so that a number of tire building processes may be employed, thus reducing the cost of the machine and the cost of tire construction.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 5 is an enlarged vertical section taken substantially on the line 5—5 of FIG. 3;

FIG. 6 is an enlarged detail section of the support of transfer ring of the carrier as seen from the line 6—6 of FIG. 5;

FIG. 7 is an enlarged vertical section, partially broken away, as taken substantially on the line 7—7 of FIG. 5;

FIG. 8 is a vertical section taken substantially on the line 8—8 of FIG. 7;

FIG. 9 is a horizontal section taken substantially on the line 9—9 of FIG. 7;

FIG. 10 is a fragmentary enlarged vertical section taken substantially on the line 10—10 of FIG. 7;

FIG. 13 is an enlarged detail sectional view illustrating the manner in which the bead seal flange is secured to and removed from the shaper;

FIG. 14 is a view similar to FIG. 11 illustrating the shaper support arm modified to include an omnidirectional bead retainer and setter, FIG. 15 is a view similar to FIG. 12 but taken substantially on the line 15—15 of FIG. 14;

Figure 4:
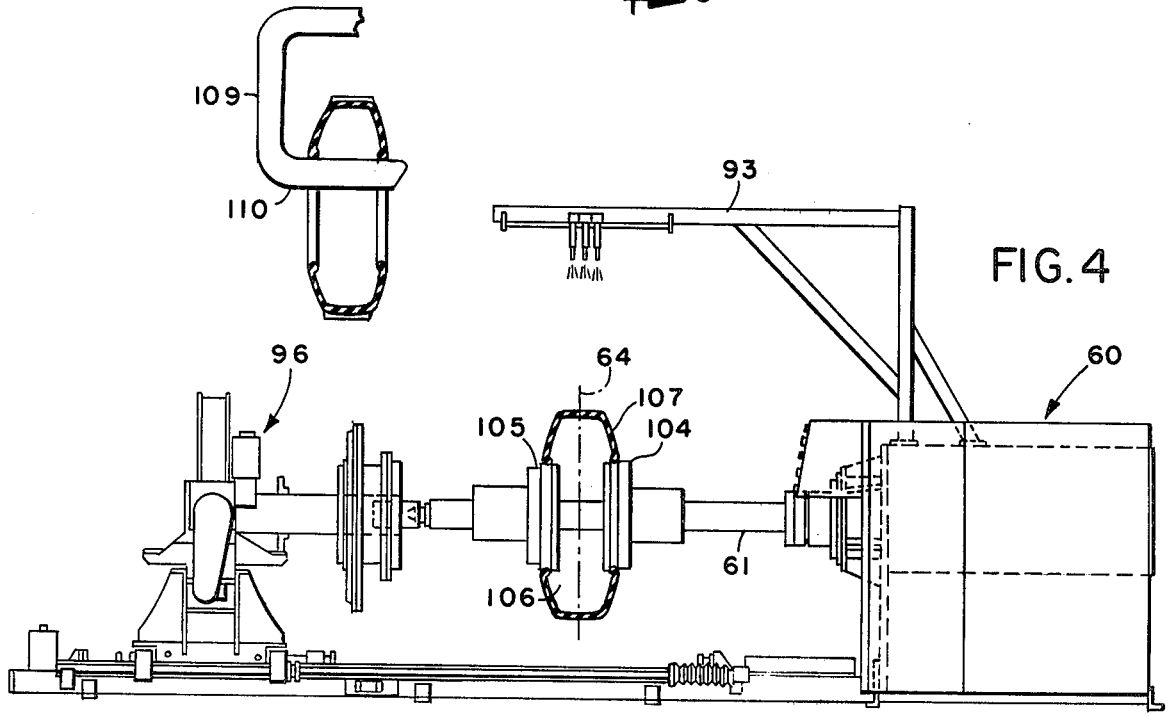
FIG. 4 is a view similar to FIG. 2 but illustrating a second stage tire building machine in accordance with the present invention and utilizing a removable outboard bead seal flange.

FIGS. 43-50 also illustrate the present invention utilized as a second stage radial tire building machine employing a sleeveless metallic shaper but without a belt and tread assembly building drum and transfer, such as seen in FIG. 4; and FIGS. 51-55 are a series of sequence diagrams illustrating the machine of the present invention as a second stage radial tire building machine with an expanding bead lock shaper again without a belt and tread assembly building drum and transfer.

THE MACHINE GENERAL ARRANGEMENT

Figure 1:
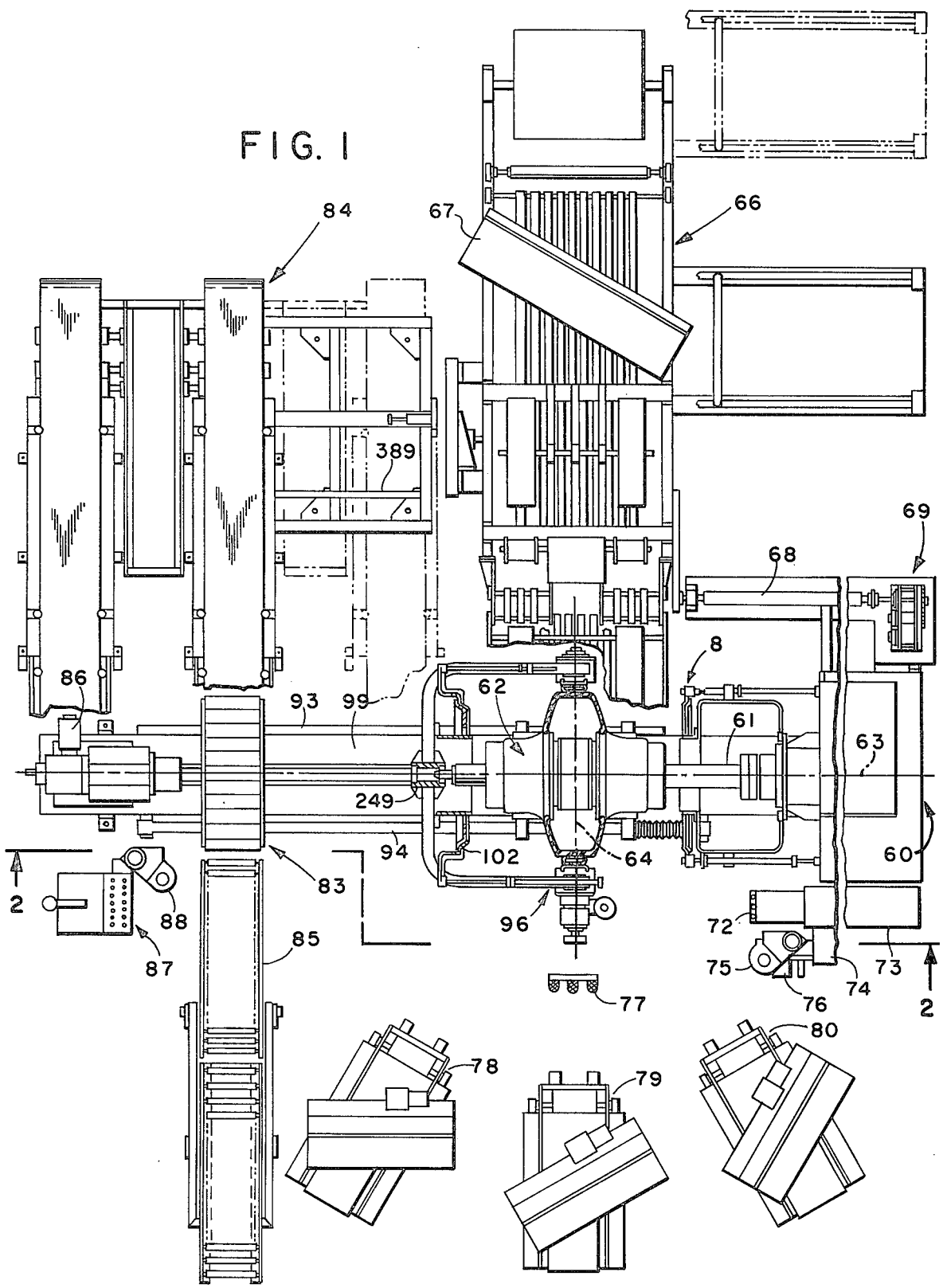
FIG. 1 is a top plan view with parts broken away and in section of a single stage tire building machine in accordance with the present invention showing the carrier for the outboard support for the drum or shaper shaft in one of its positions.
Figure 2:
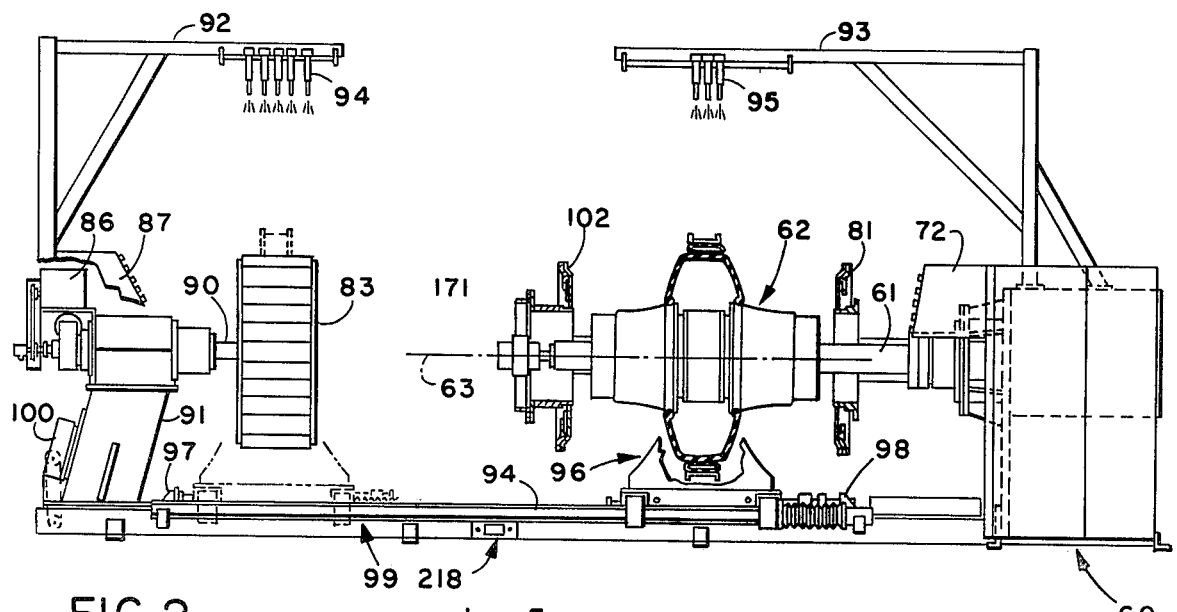
FIG. 2 is a front elevation of the machine of FIG. 1 with certain parts broken away and in section as seen from substantially the line 2—2 of FIG. 1.
Figure 3:
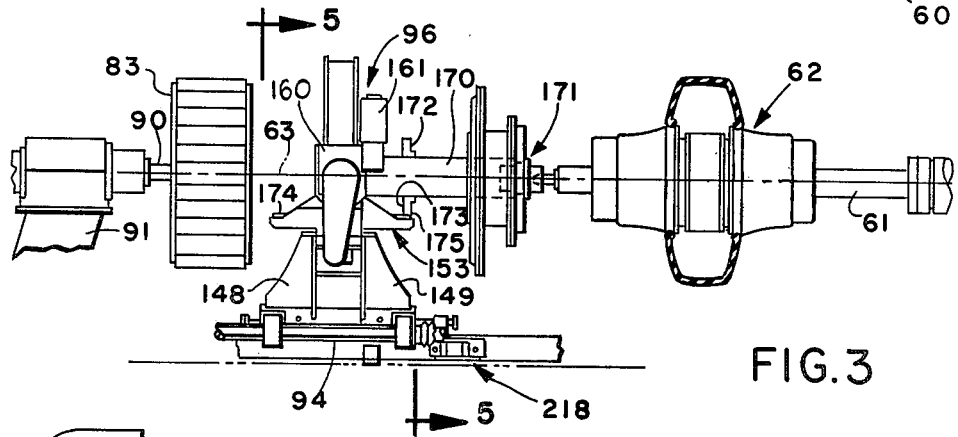
FIG. 3 is a view similar to FIG. 2 but showing the carrier and shaper support in another position during the stitching operation.

Referring first to FIGS. 1, 2 and 3, the single stage tire building machine illustrated comprises a wide variety of components, which for first or the variety of second stage machines illustrated elsewhere may be omitted or at least relocated. Moreover, many of the components are optional depending upon the number and type of components which go into the tire.

As seen in FIGS. 1 and 2, the tire building machine comprises a main housing 60 from which projects the shaft 61 of the tire building machine, such shaft supporting, for example, an expanding bead lock drum and shaper assembly shown generally at 62. The tire building machine has an axially extending centerline, which is also the axis of the shaft 61, as seen at 63. The drum or shaper also has a transversely extending centerline as seen at 64.

Aligned with such centerline is a rear applicator or servicer seen generally at 66. The rear applicator or servicer may include a dispensing unit for such items as the inner liner, chafer strips, and ply stock. A liner cutter may be provided at 67. The rear applicator or servicer may be driven from line shaft 68 through a speed selection drive indicated generally at 69 which is in turn driven from the main drive motor of the tire building machine in the housing. Such drive is shown schematically in FIG. 16.

In front of the machine to the operator's right is provided a control panel 72 on electrical cabinet 73. A tape control unit 74 for programming the automatic functions of the machine may be provided. Also a tool tray 75 is provided adjacent the operator's station. An edge strip dispenser may optionally be provided at 76. Also adjacent the operator's station there are provided certain foot controls indicated at 77. Positioned around the operator's station are additional optional component dispensers seen at 78, 79 and 80. The tire building machine also includes an inboard bead setting mechanism shown at 81.

Axially aligned with the axis of the tire building machine is a belt and tread assembly building drum 83. Such drum is of the type which expands to a set diameter and provides a substantially rigid working surface on which the belt and tread assembly is constructed. The belts or breakers may be supplied from shuttle servicer 84 while tread stock is supplied from retractable conveyor 85. The drum 83 is driven for controlled rotation by the drive 86, such drive also driving the servicer 84. The belt and tread assembly operation may be controlled from the control panel 87 by the operator and a tool tray 88 is provided for the operator's convenience. Not shown in FIG. 1 are the automatic stitching tools which are positioned beneath the retractable dispensing trays of the servicers 66 and 84 as seen in FIG. 1 or behind the drums as seen in FIG. 2.

Also as seen more clearly in FIG. 2, the drum 83 is mounted on shaft 90 and projects in cantilever fashion from the stand 91 so that there is substantial overhang. Each of the axially aligned machines may be provided with overhanging brackets seen at 92 and 93 to support guidelights seen at 94 and 95, respectively. Such guidelights are adjustable along the brackets and may be used in connection with known optical guiding systems to assist in the proper placement of the various tire components.

Extending between the two axially aligned machines parallel to the common axis 61 are two rails seen at 93 and 94 parallel to each other and also parallel to the common axis 63. Such rails support a carrier shown generally at 96 for movement therealong between adjustable stops 97 and 98. Such carrier, in somewhat modified forms comprises a common principal component or module of the various tire building machines and systems illustrated. The carrier may be driven between the adjustable stops by a chain drive in center slotted housing 99 by the drive motor seen at 100 in FIG. 2.

The carrier 96 has a wide variety of functions, many of which may vary depending upon the type of tire building operation with which it is employed. For example, in the single stage machines seen in FIGS. 1, 2 and 3, the carrier 96 may function as a belt and tread assembly transfer, a support for the outboard end of the shaft 61 in at least two positions, a support for the outboard bead setter as seen at 102, and as a finished tire unloader or removal device.

In the second stage machine shown in FIG. 4, rather than an expanding bead lock drum and shaper, the shaft 61 of the tire building machine supports rigid inboard and outboard flange assemblies 104 and 105 for controlled rotation and symmetrical axial movement toward and away from the transverse centerline 64. Air is supplied to the chamber 106 as the flanges move toward each other to expand the carcass 107 to the toroidal shape shown. Conventionally, the outboard flange 105 is a two-part flange and the projecting portion of the flange must be removed to permit the carcass in its flat band shape to be positioned on the machine and the flange then replaced to facilitate sealing and shaping as indicated. When the tire carcass is thus shaped, the shuttle belt servicer 84 may be positioned directly behind and in line with the centerline 64 so that the belt and tread assembly may be constructed directly on the carcass.

In the second stage machine seen in FIG. 4, the carrier functions as a support for the outboard end of the shaft 61, a device for automatically assembling and disassembling the outboard bead sealing flange assembly 105, and as a device for unloading the finished tire. When the carrier has brought the finished tire to the left as seen in FIG. 4, it may readily be transferred to a tire removal hook as seen at 109 which includes a bottom horizontal bar 110. In the removed position of the tire, the interior of the tire is of course clear readily enabling the hook element 110 to be positioned so that it is interior of the tire to engage the tire for transport in the manner indicated when the tire is released by the carrier.

CARRIER 96

It will initially be appreciated that the term "carrier" is only one of several terms which may equally well be applied to the machine component 96. For example, it could equally well be termed a shaft support, a bead setter, a flange setter and removal device and a tire unloader.

In any event, referring now to FIGS. 5, 6, 7 and 8, it will be seen that the carrier 96 comprises a carriage which rides on the rails 93 and 94, the former being square in section while the latter is circular. The carriage includes a sub-base 112, the principal structural component of which is inverted channel member 113, the downwardly extending legs of which are interconnected by horizontal plate 114. Secured to one side of the sub-base are two inverted L-shape brackets 115 each of which supports a large top roller 116 on top of the rail 93 and somewhat smaller roll 117 on the underside of the rail 93. Projecting from the other side of the carriage sub-frame are ears 118 in which sleeve bearings 119 are secured by the retainers 120, such sleeve bearings sliding on the circular rail 94.

Projecting from the underside of the plate 114 is a chain clamp 122, seen in FIG. 7, by which the upper flight of the drive chain 123 is secured to the carriage sub-frame.

The sub-frame 112 of the carriage of the carrier supports a main frame 125, the base member of which comprises inverted channel 126. Such channel 126 is somewhat larger than the channel 113, the latter nesting therewithin. The channel 126 is supported spaced from the channel 113 by a series of adjusting and leveling screw assemblies. On each side there are two spaced horizontally disposed adjusting screw assemblies extending between the adjacent vertical edge flanges. Between the horizontal plates of such channels are four such leveling screw assemblies as seen by the centerlines 127 and 128. In addition, the top horizontal portion of the channel 113 is provided at each axial end with an upturned L-shape bracket 130. Such bracket fits within a notch 131 in the end edge of the horizontal portion of the channel 126. The top horizontal plate of the channel 126 is provided with a similar upstanding bracket parallel to the bracket 130 and adjusting screw assembly 132 extends therebetween at each end of the carriage.

Accordingly, there is a total of 10 leveling or adjusting screw assemblies interconnecting the sub-frame and the frame member 126. All such adjusting screw assemblies may be identical in form and one, for convenience, is shown in detail in FIG. 8.

Referring to FIG. 8, it will be seen that each such adjusting screw assembly comprises a relatively small threaded stud 134 extending through an oversize hole 135 in the sidewall of the channel member 113. On each side of such hole is a set of mating concave-convex washers as indicated at 136 and 137. The smaller stud 134 is threaded into a blind tapped hole 138 in larger and shorter stud 139 which is in turn threaded into tapped through-hole 140 in the vertical leg of the channel 126.

The four leveling screw assemblies between the horizontal plates of the two channels are employed for precise leveling. The two adjusting screw assemblies on each side of the carriage may be employed to obtain the precise axial alignment. The two leveling screws at each end of the carriage may be employed to obtain precise axial centering. In this manner the carrier can very precisely be positioned on its carriage not only for leveling, but also for axial alignment and precise centering in its various functional positions.

As seen in FIG. 5, extending upwardly in opposite directions from the channel member 126 are two arcuate frame members 142 and 143 each of which includes vertically extending side plates 144 and 145. Such side plates on the inner edge thereof are interconnected by bridge plates 146 and 147. Each of the side plates is also rigidified by the gusset plates 148 and 149, the profile configuration of which is perhaps more clearly seen in FIGS. 3 and 4. Such frame assemblies are securely welded to the channel member 126 and each includes at the top L-shape members 152 and 153. The bottom horizontal leg of the L as indicated at 154, which is secured between the side plates of the somewhat arcuate frame members, has a substantial horizontal extent while the top or vertical leg 155 has the profile configuration of a triangle with an enlarged extension at the apex. In each extension there is provided a hole, through which extends axially aligned pivot shafts 157 and 158.

The former shaft 157 is somewhat shorter than the latter and is journaled for rotation as indicated at 159 in an axially elongated sleeve bearing secured to and supported from the exterior of the member 152. The shaft 158 is somewhat longer and is the output shaft of the gear box 160 of gear motor 161 which is mounted on cup-shape support 162 secured to the exterior of the member 153. The shaft is also journaled at 163. The outer or righthand end of the shaft 158 as seen in FIG. 5 includes a sprocket driving chain drive 165 which in turn drives rotary limit switch assembly 166 secured to the underside of support bracket 167 extending from the arm 143.

The inner end of each shaft is secured to the respective end of parallel legs 169 and 170 of U-shape arm 171. The leg 169 of the U-shape arm assembly 171 is provided with projecting stop 172 and the leg 170 with oppositely projecting stop 173 as seen, for example, in FIG. 3, such stops engaging adjustable stops 174 and 175, respectively, as seen in detail in FIG. 5. Such adjustable stops are threaded in tapped holes in projections 176 secured to the axially extending portions of the members 152 and 153. The stop 172 is designed to engage the adjustable stop 174 while the stop 173 is designed to engage the adjustable stop 175. In either position, the arm assembly will extend horizontally. In the position shown in FIG. 2, the stop 174 is engaged by the stop extension 172 while in the position shown in FIG. 3, the stop extension 173 is in engagement with the adjustable stop 175. Movement between such stop positions, and any desired position therebetween, is of course obtained by the gear motor 161. The arm assembly is thus mounted for movement on the carrier for swinging about a horizontal axis 178 which is normal to the centerline 63 of the tire building machine as well as the belt and tread assembly building machine. Such axis extends normal to the plane of FIG. 5.

In addition to supporting the arm assembly 171 for such swinging movement, the carrier arms 143 and 144 also support transfer ring assembly 180. Such transfer may be of the pneumatic bag type which includes a pneumatic bag 181 secured to the interior of channel-shape ring 182. The interior of the bag is provided with a series of molded blocks 183 which, when the bag is expanded, move radially inwardly to grip a tire or belt and tread assembly therewithin. When the bag is deflated, the bag automatically collapses to release the belt and tread assembly.

The ring channel 182 of the carrier is supported by the bronze yokes seen at 185 and 186 secured to horizontally diametrically opposite sides of the ring by the fasteners indicated at 187 extending through the side walls of the channel. As seen more clearly in FIG. 6, each yoke is provided with a downwardly extending U-shape slot 188 having a flared lower end as indicated at 189. The slots closely accommodate the inner ends of pivot shafts 157 and 158. Vertical or height adjustment is obtained by adjusting nut 190 on screw 191 secured to the base. The screw projects into a hole in block 193 to the underside or exterior of the channel in the same fashion as the yokes. In this manner the carrier ring can simply be vertically set into place. Rings of different diameters can readily be accommodated by employing thicker yokes and a longer height adjusting screw.

INTERMEDIATE CARRIAGE STOP—FIGS. 7–10

In order to be effective to perform some of its variety of functions, the carriage supporting the carrier 96 for movement between the adjustable stops 97 and 98 must be brought to a precise positive stop intermediate such adjustable stops.

To obtain the required intermediate positive stop, there is provided the retractable stop seen in greater detail in FIGS. 7–10. Referring first to FIG. 7 it will be seen that the sub-frame 112 of the carriage of the carrier itself includes oppositely projecting adjustable stops 196 and 197, the former including threaded stud 198 extending through a tapped through hole in block 199 which is secured between the frame member 113 and the plate 114 of the sub-frame 112.

The opposite stop 197 is somewhat more complex and includes a threaded stud 201 which is threaded in a tapped through hole in block 202 similarly secured in the sub-frame. The opposite end of the threaded stud 201 is similarly secured in blind tapped hole 203 in stop member 204. Such stop member is generally cylindrical and shouldered as indicated and extends through hole 205 in vertically depending or offset stop member 206. The offset stop member projects downwardly from the stud and includes a hole 207 therethrough which accommodates the upper flight 123 of the carriage drive chain. Both the upper and lower flight, the latter shown at 210, of such chain pass normally between the square tubular frame members 211 and 212 of the base frame 99. Such frame members may be secured to the floor by the angle brackets seen, for example, at 214 and 215 and may be interconnected at the top by slotted bridge plate 216. The offset 206 rides within such slot.

In order for the carrier to function properly it must be brought to a positive intermediate stop, and then must be able to move beyond that stop to perfrom other functions. Accordingly, a retractable stop is provided as generally indicated at 218 in FIGS. 7, 8 and 9 and as also seen in FIGS. 2 and 3.

In order to provide access to the retractable stop, the tubular frame members 211 and 212 may be cut away as indicated. The bottoms of the two structural members 211 and 212 are interconnected by a bridge plate 219 slotted as seen at 220. However, unlike the slot in the bridge plate 216, such slot need not extend the full length of the frame member 99. Spaced support plates are secured to the bottom slotted wall of the frame member thus fabricated by the fasteners indicated, such support plates being spaced again to provide a slot accommodating the lower flight 210 of the chain drive. Secured to the two support plates in bridging fashion is an inverted key slot 224 in which is accommodated sliding inverted T stop block 225. As seen in FIG. 9, the projection 206 depending from the carriage has a diagonal stop face 226. The stop block 225 also has a diagonal stop face parallel thereto. This permits the stop to be removed readily from the path of the projection 206 when in engagement therewith.

Connected to the sliding stop block 225 is the rod 230 of piston cylinder assembly 231 which is mounted on upstanding plate 232 secured to the base plate 221. The rod projects through the plate 232.

Also connected to the sliding stop block 225 is an actuator 233 for limit switch 234. The switch arm 235 is confined for movement between adjustable discs 236 and 237 mounted on the actuator 233. The limit switch signals the position of the retractable stop.

In order to deflect the lower flight 210 of the chain drive beneath the stop slide 224 there may be provided two idler sprockets as seen at 239 and 240, each of which is journaled on stub shafts 241 which are secured to respective blocks 242 in the manner indicated more clearly in FIG. 10, such blocks being secured to the mounting plate 222. A chain guard may be provided as indicated at 243. The retractable stop may of course be positioned anywhere along the path of travel of the carrier depending upon the function it performs.

SEALING FLANGE REMOVAL AND REPLACEMENT—SECOND STAGE MACHINE

Figure 11:
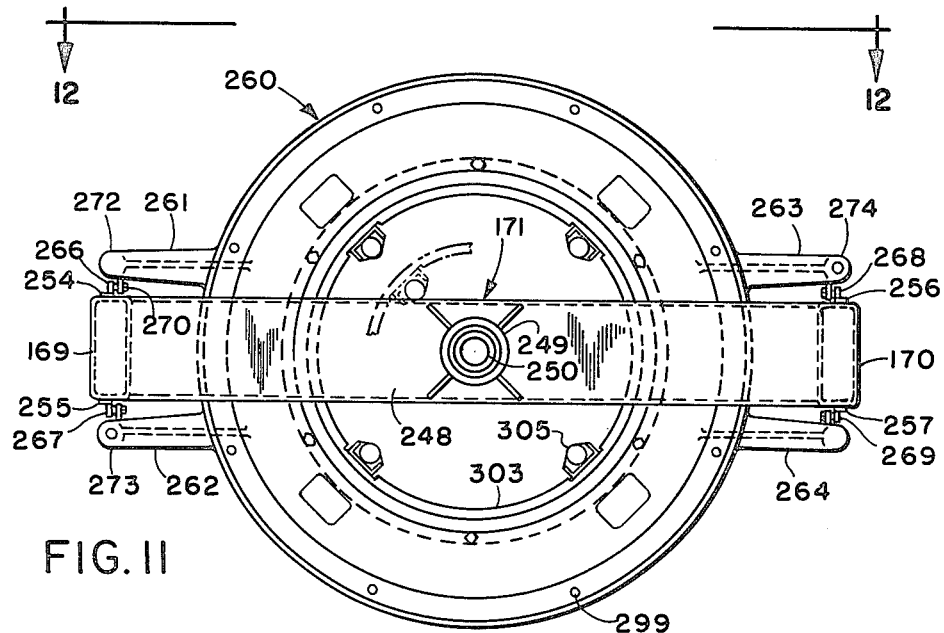
FIG. 11 is an end elevation of the support arm as modified to include actuating means for the automatic removal and replacement of a bead seal flange of a shaper when used as in the FIG. 4 embodiment.
Figure 12:
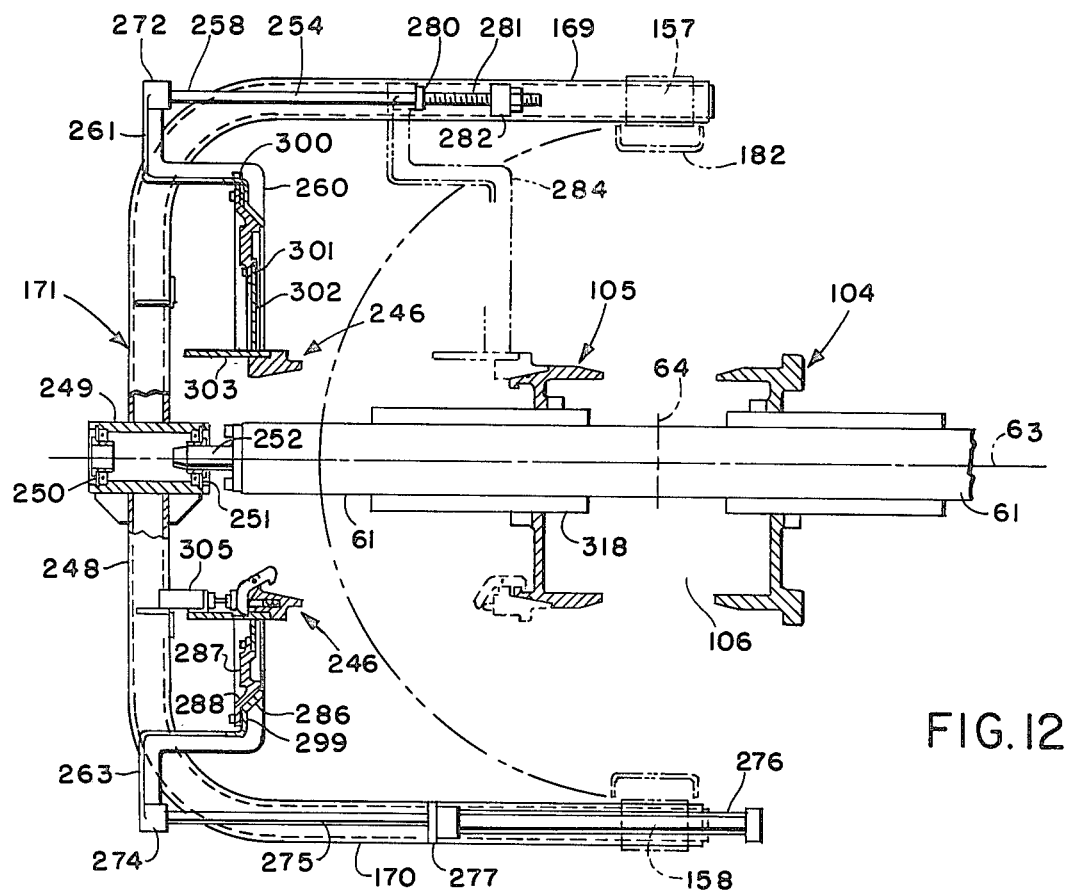
FIG. 12 is a view taken substantially on the line 12—12 of FIG. 11 illustrating the bead seal flange in its retracted disassembled position in full lines and in its assembled position in phantom lines.

Referring now to FIGS. 11, 12 and 13, in addition to FIG. 4, it will be seen that the revolving or swinging arm assembly 171 of the carrier 96 may be utilized automatically to remove and replace a sealing flange 246 which is part of the outboard sealing flange assembly 105 of the second stage machine seen in FIG. 4. Such sealing flange assemblies 104 and 105 are mounted on the shaft 61 for axial movement toward and away from each other symmetrically with respect to the centerline 64. However, in order to remove and replace a tire carcass between such sealing flange for inflation and shaping, the sealing flange 246 of the assembly 105 must be removed and replaced. It should be noted that with smaller size tires such as passenger tires, the tire beads can be buttonhooked into place. This is not generally possible with larger size tires such as truck tires.

The revolving or swinging arm assembly 171 of the carrier 96 includes a bight portion 248 interconnecting the parallel legs or arms 169 and 170. In the center of the bight portion there is provided a sleeve 249 which at each end includes a ball bearing journal as seen at 250 and 251 adapted to receive the pilot nose 252 of the shaft 61 of the tire building machine. The pilot nose end of the shaft may be received in either journal, depending upon the position of the arm 171.

As seen, the arm assembly 171 is fabricated of a rigid rectangular tubular frame member and the narrow edges of the legs are each provided with guide rails or tracks as seen at 254 and 255 for the leg 169 and 256 and 257 for the leg 170. Such tracks may extend slightly beyond the curved corners of the arm assembly as indicated at 258 and be interconnected to rigidify the same.

A circular frame 260 includes four arms which are offset both axially and radially as indicated at 261, 262, 263 and 264. The outer ends of such arms each support guide rollers 266, 267, 268 and 269, each on the brackets indicated generally at 270. The guide rollers 266 and 269 ride on the rails or tracks 254 and 257, respectively. Such rollers may be flanged for guiding purposes. Other guides such as rods may be provided. The arms and their respective rollers thus confine the circular frame 260 for movement along the legs 169 and 170 of the revolving arm assembly 171 of the carrier 96.

The end of each arm 261–264 is formed as a hub as indicated at 272 and two of such hubs seen at 273 and 274 are provided with blind tapped holes to which are secured the rods 275 of piston-cylinder assemblies 276. Such piston-cylinder assemblies are of relatively long stroke and are secured to brackets 277 extending from one side of the leg 170 and the opposite side of the leg 169. Thus the piston-cylinder assemblies are connected to the offset arms 262 and 263 of the frame 260. In this manner a piston-cylinder assembly is provided on the bottom of the leg 169 and on the top of the leg 170 as seen in FIGS. 11 and 12. On the opposite side of such legs there is provided an adjustable stop 280, each stop being mounted on threaded stud 281 threaded in through hole of projection 282 projecting from such leg. The position of such stops may readily be adjusted so that retraction of the piston-cylinder assemblies 276 will bring the frame 260 to the phantom line position shown at 284.

As seen in FIG. 12, the frame 260 includes a beveled flange 286, the inner surface of which is a spherical radius. To the beveled flange is secured an adapter 287 which includes a conical portion 288 mating with the interior spherical surface of the beveled flange 286. Centering screw mechanisms 299 secure the two together, such centering screw mechanisms being generally similar to the centering and leveling screws shown in detail in FIG. 8. Similar centering screw mechanisms may also be provided at 300 engaging the edge of the adapter, if desired. Normally, such additional adjustment normal to the axis 63 will only be required in connection with the bead setter hereinafter described. In this manner the adapter can be mounted on the frame 260 in a manner such that it is normal to the axis 63, and axially aligned therewith.

Secured to the adapter by the fasteners indicated at 301 is an annular plate 302 which at its inner end supports cylindrical plate 303.

As seen more clearly in FIG. 13, the cylinder 303 has secured to the interior thereof four piston-cylinder actuator assemblies 305 which are mounted on brackets 306. The rod 307 of each piston-cylinder assembly is provided with a plunger 308. Also, as indicated in FIG. 13, the cylinder 303 is provided with an interior groove or notch seen at 309.

Referring now more particularly to FIG. 13, it will be seen that the removable flange 246 of the outboard flange assembly 105 includes a shoulder 311 which abuts against the axial end of the cylinder 303. Such removable flange also includes a cylindrical portion 312 fitting within the cylinder 303. When seated as indicated, the cylindrical portion 312 extends substantially to the groove 309. The removable flange also includes on the interior thereof spaced thereabout clevis type pivots 314 for latching dogs 315. Each latching dog includes on its outer end a hook 316 adapted in one position thereof to engage behind the hook surface 317 of the portion 318 of the flange assembly 105 which is secured to the shaft 61 of the machine through the axially sliding hub 318. The opposite end of the latching dog is curved as indicated and includes a pressure or camming surface 320 on one side adapted to bear against the plunger 308 and a pointed projection 321 which fits within the groove or slot 309 when the plunger is extended. The latching dog is urged to its full time position by plunger 322 mounted in the removable flange and urged outwardly by the spring 323. When in the full line position shown, the latching dog engages the hook surface 317 securing the removable flange 246 to the remainder of the flange assembly 105.

However, when the piston-cylinder assemblies 305 are actuated, the hook 316 is disengaged and the opposite end of the latching dog is positioned or forced against the side 324 of the slot 309 which, not only releases the flange 246 from the assembly 105 but also secures it to the cylinder 303. When secured to the cylinder, the piston-cylinder assemblies 276 may be extended moving the frame and thus the cylinder from the phantom line position 284 to the full line position shown in FIG. 12. The carrier may then remove the sealing flange 246 so that a shaped and finished tire may be axially removed from the machine and a new band or carcass repositioned for shaping and final construction. The process steps employed are described hereinafter in greater detail.

In order to adapt the machine to tires of differing bead diameters, it will be appreciated that the inboard sealing flange 104 and the two-part outboard sealing flange 105 may be replaced by flanges of different diameter. The assembly comprising the disc 302 and the cylindrical plate 303 may also be replaced with assemblies of correspondingly different diameters.

It is noted that the releasable flange 245 is provided with a pilot surface seen at 329 mating with a similar pilot surface on the portion of the sealing flange assembly which remains on the shaft 61. In this manner the flange is automatically centered as it is replaced. When replaced, retraction of the piston cylinder assemblies 305 will release the flange from the cylinder 303 while simultaneously engaging the latch 316-317 to secure the flange in place. At that point the piston cylinder assemblies 276 may extend retracting the frame 260 to the full line position seen in FIG. 12.

OUTBOARD BEAD SETTER—FIGS. 14 AND 15

Referring now to FIGS. 14 and 15, it will be seen that the outboard bead setter 102 employed with the single stage machine seen in FIGS. 1, 2 and 3, is supported on the same annular frame 260 as employed with the flange removal mechanism seen in FIG. 11 and 12. Such frame is mounted for movement on the arms 169 and 170 of the revolving carrier arm 171 in the same manner. Even the same adjustable stops 280 may be employed limiting the movement of the frame to the right as seen in FIG. 15. Such frame includes the same conical inner portion 286, the interior surface of which is radiused or slightly concave, such surface cooperating with the flat conical surface of the conical portion 331 of adapter 332. Centering screw assemblies 299 and 300 secure the adapter to the frame so that the adapter may be adjusted that is for limited transaxial and axial directional adjustment to lie perfectly normal to and aligned with the axis 63 of the machine. The inner end of the adapter has secured thereto a flat ring 334 which constitutes a fixed bead gripping element for bead 335. The ring 334 at its inner end is closely adjacent to cylinder 336, the left hand end of which as seen in FIG. 15 is provided with a shouldered flange 337. Such flange is removably secured to annular shouldered ring 338 secured to the interior of the bight portion 248 of the arm 171. Semi-circular stiffeners may be provided connected to the ring on each side of the arm as seen at 339.

Mounted on the outer of lefthand side of the adapter as seen in FIG. 15 are four piston cylinder assemblies 341, the rods 342 of which extend through the adapter and have secured to the outer ends thereof bead gripping fingers 343. The piston cylinder assembly 341 is of the type which includes a cam or groove in the rod 342 so that as the rod moves axially, it also rotates about its own axis. In the retracted position the fingers will assume the position seen in phantom lines at 345 in FIG. 14 holding the bead 335 against the ring 334. In the extended position of such piston cylinder assemblies, the fingers will pivot clear of the bead as seen by the phantom line position 346 in FIG. 14. In the clear position 346 the fingers will clear the flipper or apex 347 of the bead 335. This will enable the bead to be deposited precisely where desired as indicated by the phantom line position 348 in FIG. 15. It will also enable the operator to place a new bead on the cylinder 336 for the next building cycle.

In operation, with the piston cylinder assemblies 276 extended and the piston cylinder assemblies 341 also extended, the operator will place a bead against the ring 334. At this point the piston cylinder assemblies 341 are retracted gripping the bead as shown. Then, during the proper point of the cycle of the machine, the piston cylinder assemblies are retracted to position the frame 260 against the adjustable stops 280, which in such position will place the bead at the position 348 for bead lock up. The piston cylinder assemblies 341 are then extended to clear the bead apex and the piston cylinder assemblies 276 are then extended to retract the outboard bead setter leaving the bead in the position 348. The piston cylinder assemblies 341 are not then retracted until a new bead has been positioned against the ring 334.

With the support of the adapter on the radiused conical inner surface of the frame, the bead can be positioned with both the desired concentricity and squareness necessary for the precision construction of tires.

MACHINE DRIVE—FIG. 16

Figure 16:
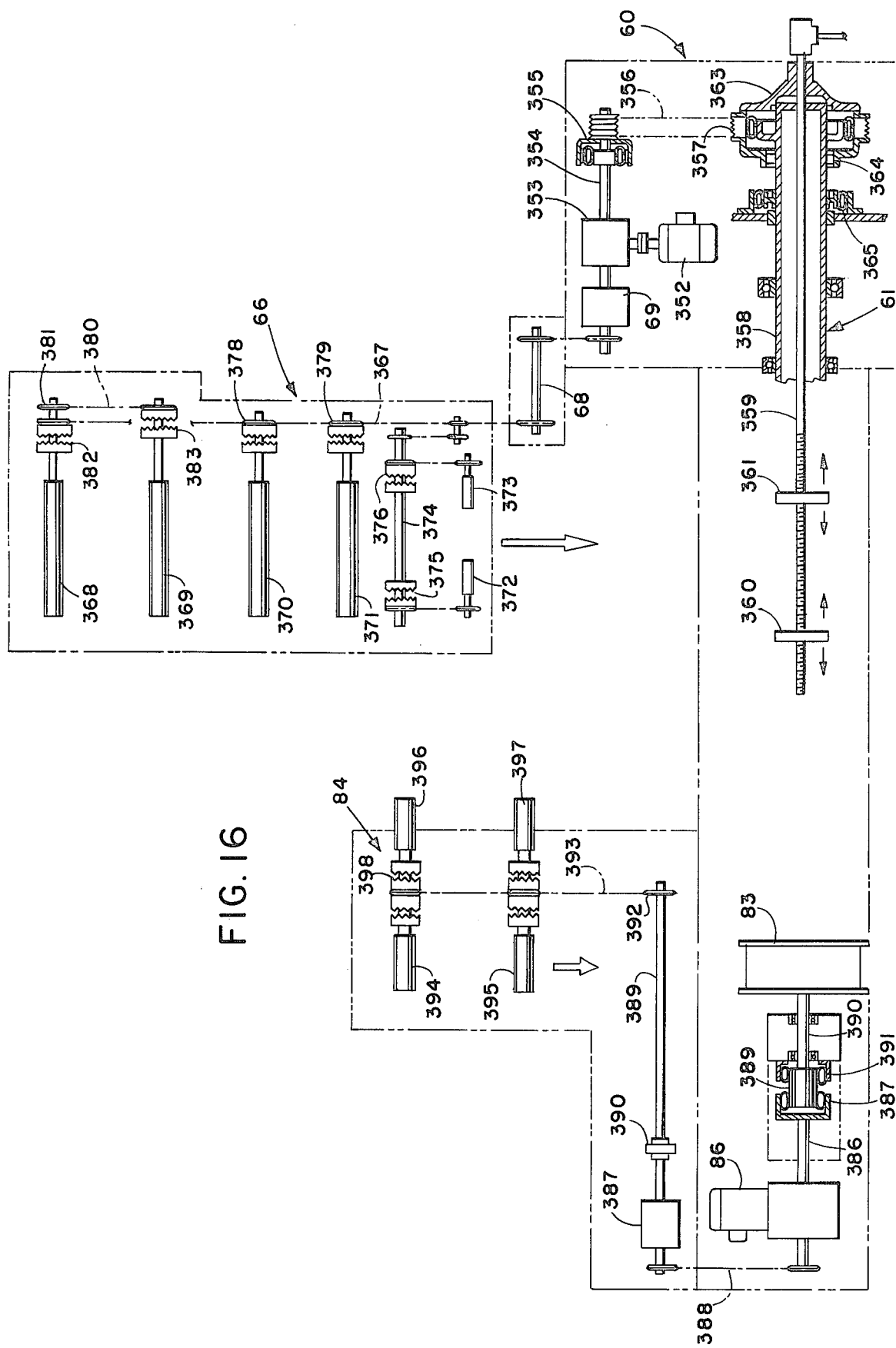
FIG. 16 is a schematic illustration of the main drive for the tire building machine and the manner in which the ply stock servicer is driven therefrom.

Referring now to FIG. 16 it will be seen that both the shuttle servicer 84 for the belt and tread assembly building drum 83 as well as the rear applicator of servicer 66 for the tire building machine may be driven from the drives of the respective machines.

The main drive motor for the tire building machine 352 drives gear box 353 driving shaft 354. One end of the shaft accommodates main drive clutch 355 which selectively, through belt drive 356, drives the main drum clutch 357 of the shaft 61 of the machine.

The shaft 61 actually includes two concentric shafts 358 and 359 which may be rotated in unison or with respect to one another. In the latter condition, the flanges seen at 360 and 361 each mounted on opposite hand screws on the shaft 359 will move toward and away from each other. Such flanges may support the sealing flanges of the FIG. 4 embodiment or the bead locks of the drum and shaper 62 of the FIG. 1 embodiment.

The clutch 357 includes a hub 363 which is keyed to the inner shaft 359. Such hub is also journalled, as indicated at 364 to the outer shaft 358. When the clutch 357 is engaged, both shafts will rotate in unison. When such clutch is disengaged and the brake 365 is engaged, the shafts will rotate with respect to each other. Reference may be had again to applicant's copending application Ser. No. 814,196 filed July 11, 1977, entitled "Tire Building Machine" for a more clear disclosure of the manner in which the clutch 357 and the brake 365 may be employed to rotate the concentric shafts of a tire building machine.

The opposite end of the output shaft 354 may be employed to drive quick change gear box or transmission 69 which in turn drives the line shaft 68. By changing the gearing of the transmission 69, the speed of the drive for the rear applicator or servicer may be varied to be in synchronism with the periperal speed of the drum required for the construction of different size tires so that the materials in the rear applicator may be dispensed on the drum or shaper at the proper speeds to avoid stretching or distortion. Alternatively the gear box may be a fixed ratio and the sprocket driving the same may be changed.

The line shaft 68 drives chain drive 367 which may run continuously. The rear applicator may contain a wide variety of tire building components and as illustrated, the chain drive 367 may drive an inner liner roll 368, an inner liner conveyor roll 369, a number 2 ply roll 370, a number 1 ply roll 371, and left and right hand chafer rolls 372 and 373. The latter may be selectively driven from common shaft 374 by the electromagnetic or pneumatic tooth-type clutches seen at 375 and 376. The two ply rolls 370 and 371 may be driven directly from the chain drive 367 by the clutches 378 and 379. The shaft of the inner liner conveyor may be driven by chain drive 380 from the drive shaft 381 of the inner liner to insure synchronization, and both the inner liner and the inner liner conveyor rolls may be selectively driven through the clutches seen at 382 and 383. Each of the clutches of the rear applicator 366 may be controlled by the operator so that he may selectively dispense the desired component to the building drum when desired.

Accordingly, the drive motor 352 drives the rear applicator or servicer 66 continuously and the tire building machine selectively. The same common drive is employed in connection with the belt and tread assembly building drum 83.

The drive motor 86 drives shaft 386, one end of which is provided with a clutch 387 which when engaged will rotate the hub 389 on the drive end of the shaft 390 for the drum 83. Also on such hub is a brake 391 which will be engaged when the clutch is disengaged.

The opposite end of the shaft 386 drives transmission 387 through chain drive 388. The transmission 387 may be of the gear-change type and drives line shaft 389 through flexible coupling 390. The drive sprocket 392 for the servicer chain drive 393 slides axially along the shaft 389. The servicer may include four units, two on each side of the central housing for the chain drive 393, such units being represented schematically by the rolls shown at 394 and 395 on one side and 396 and 397 on the other. Each roll is selectively driven through electromagnetic or pneumatic tooth-type clutch for each unit as illustrated at 398, there being four such clutches, one for each roll or unit. Again the operator will select the belt for application to the drum 83 by engagement of the clutch of the unit of the selected belt. For the machine of FIG. 4, it will of course be understood that the belt servicer 84 may be positioned directly behind the center lines 64 of the shaping machine to construct the belt directly upon the shaped carcass.

MODULAR TIRE BUILDING MACHINE ARRANGEMENTS

SINGLE STAGE RADIAL TIRE BUILDING MACHINE—FIGS. 17-26

In FIGS. 17-26 there is an arrangement similar to that shown in FIGS. 1, 2 and 3 which utilizes the components of the present invention in a single stage operation completely to build a relatively large tire such as a radial truck tire. The machine employs a shaper or drum of the expanding bead lock type.

Figure 17:
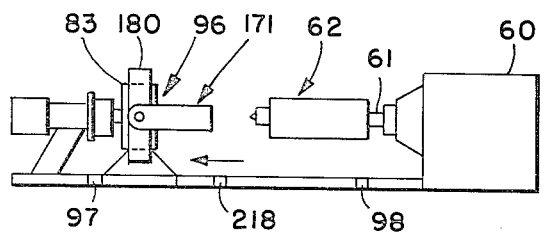
FIGS. 17-26 are schematic sequence diagrams of a single stage radial tire building machine in accordance with the present invention utilizing an expanding bead lock type shaper.

Referring first to FIG. 17, the operator has built a belt and tread assembly on a drum 83 and the drum remains expanded. The operator may now depress an automatic cycle start switch causing the carrier 96 to move to the left against adjustable stop 97 placing the transfer ring 180 on center around the belt and tread assembly on the drum 83. The transfer ring is now expanded causing the lugs 183 to contract uniformly. While this is occurring, the operator may place the beads on the inboard and outboard bead supports. This of course may be accomplished even though the arm assembly 171 is extending 180° opposite the direction in which it will extend when the bead is placed automatically.

Figure 18:
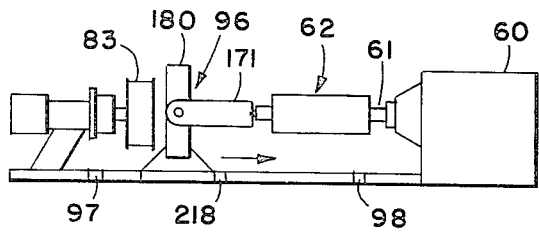

After the transfer has gripped the belt and tread assembly, the drum 83 is then collapsed and the transfer or carrier now shifts to the right to engage and support the drum shaft 61 as shown in FIG. 18. The belt and tread assembly of course now moves axially clear of the drum 83 with the transfer ring 180. In such position the carrier will engage intermediate stop 218.

With the drum shaft now properly supported, the operator builds up a carcas on the shaper or drum 62 by applying, for example, sidewalls, an inner liner, chafers, and one or more body plys, after the application of which they will of course be stitched as required.

Figure 19:
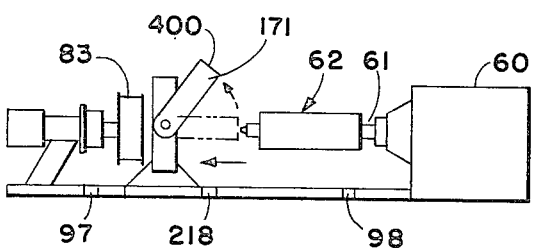

As seen in FIG. 19, after the carcass is completed, the operator then causes the carrier to shift to the left to enable the arm assembly 171 to disengage the carcass drum shaft. As soon as it is clear, it may begin to pivot in the counterclockwise direction to clear the drum or shaper 62. While this is occurring, the operator may commence the construction of the next belt and tread assembly on the re-expanded drum 83.

Figure 20:
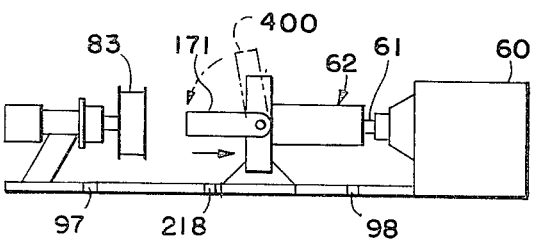
Figure 21:
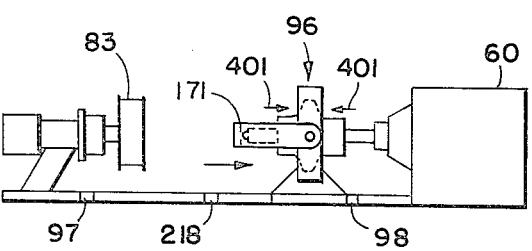

When the arm assembly 171 is clear of the carcass as indicated by the intermediate position 400, as seen in FIGS. 19 and 20, the retractable stop 218 is removed and the carrier begins to shift to the right while the arm assembly continues to pivot in a counterclockwise direction. After the arm achieves its horizontal position seen in FIG. 20, the carrier continues to shift to the right until stop 98 is engaged as seen in FIG. 21. In such position the shaft is again supported by the now reversed journal 249. When the carrier is against the stop 98, the transfer is of course centered with respect to the center 64 of the shaper or drum 62. In such position the bead setter cylinders are now actuated to set both the inboard and outboard beads and the bead locks of the shaper are then expanded. The bead clamp cylinders 341 are then extended to release the beads and the bead setter cylinders then retract the bead setters. The setting of the beads is shown schematically in FIG. 21 by the arrows 401.

With the beads set and the bead setters retracted, shaping bladders at each end of the shaper or drum are inflated to turn up the plys and sidewalls. Also, the expanded bead locks are moved toward each other uniformly and the tire carcass is inflated or shaped to the condition shown generally in FIG. 1. The tire is thus shaped into the belt and tread assembly positioned therearound and held by the transfer ring 180. When the shaping bladders start to deflate, the transfer ring is collapsed releasing the belt and tread assembly. Although the drum shaft need not be rotated at this time, although it may if some hand tool stitching is required, its shaft is nonetheless supported for concentricity and squareness.

Figure 22:
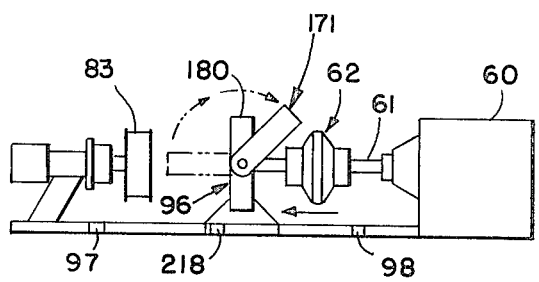

Now moving to FIG. 22, after the sidewalls are turned up and the transfer ring releases the belt and tread assembly, the carrier now begins to shift to the left to disengage the drum shaft. The arm assembly then begins to pivot in a clockwise direction as seen in FIG. 22. When the arm assembly 171 is clear of the belt drum 83, the carrier continues to shift to the left moving beyond the retracted stop 218.

The arm assembly 171 continues to pivot and the transfer or carrier continues to shift to the left to a position where the arm assembly will clear the shaft 61. In such clear position the arm continues to pivot to a horizontal position and when in such position the carrier now shifts back to the right to engage and support the shaft 61 with the carrier against the intermediate stop 218, all as seen in FIG. 23.

Figure 23:
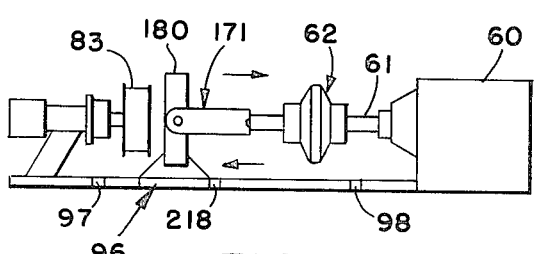

In the position of FIG. 23, the stitching cycle begins and the belt and tread assembly is then stitched to the carcass shaped therewithin.

Figure 24:
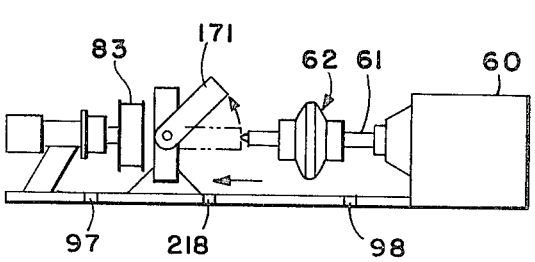
Figure 25:
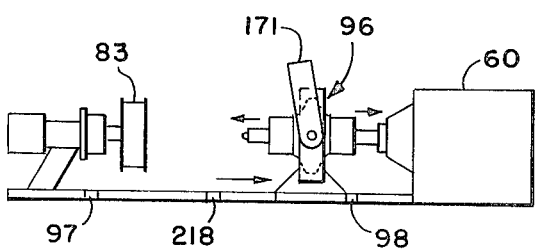

Referring to FIG. 24, after the stitching cycle is complete the carrier 96 now begins to shift to the left so that the arm assembly 171 may be disengaged from the shaft 61. The arm assembly pivots counterclockwise to an intermediate clear position 400. In such position the retractable stop 218 is again removed so that the carrier may move to the right to the position seen in FIG. 25. The carrier 96, against the stop 98 in FIG. 25 is now in a tire removal position and the transfer ring is again expanded. At this point the bead locks are collapsed and the shaping drum reverts to its original essentially flat condition as seen in FIG. 17 and also in FIG. 26. In such position the tire is then free to be moved axially to the left to a selected intermediate position such as seen at 402.

It should be noted that from the position of FIG. 18 when the automatic cycle has commenced, to the position of FIG. 25, the entire building operation may proceed automatically. Accordingly, the operator during such time period may be constructing another belt and tread assembly on the drum 83. After or during the belt and tread assembly operation, it is center stitched to compile or adhere together the components prior to transfer. By the time the tire is being removed from the now flat drum 62, the operator has by then completed the next belt and tread assembly.

Figure 26:
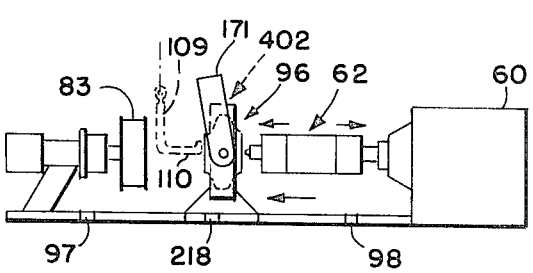

In FIG. 26 a tire removal device such as the hook 109 may be positioned as shown so that movement of the carrier to the left will position the horizontal portion of the hook within the tire. The transfer then simply releases the tire onto the hook for removal from the machine. The removal of the tire in the manner indicated may happen concurrently with the reversion of the drum or shaper 62 to its original flat position. When the tire is removed, the carrier then reverts to its FIG. 17 position against the stop 97 and the cycle starts again.

SECOND STAGE MACHINE WITH EXPANDING BEAD LOCK SHAPER

Figure 27:
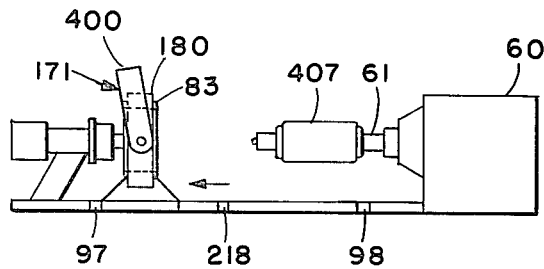
FIGS. 27-34 are a series of schematic sequence diagrams illustrating the present invention as a second stage radial tire building machine utilizing an expanding type bead lock shaper.
Figure 32:
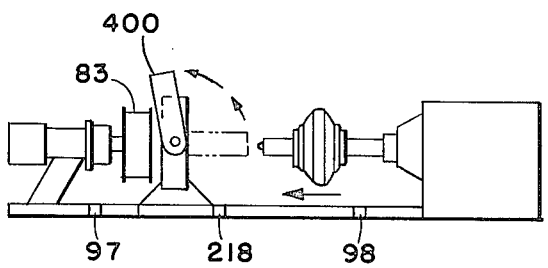
Figure 33:
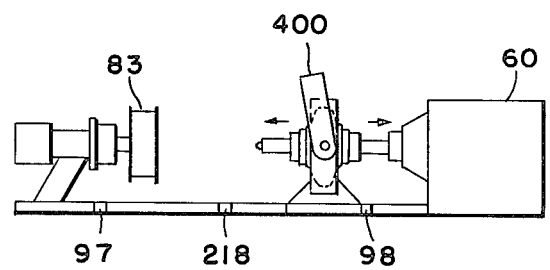
Figure 34:
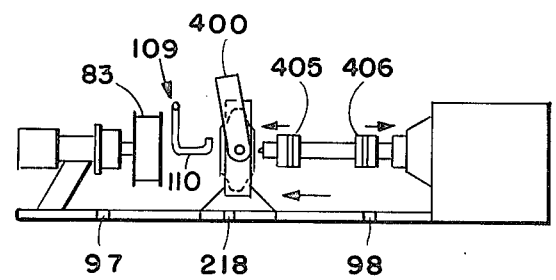

Referring now to FIGS. 27-34 there is illustrated again a machine using the same or similar components. It should be recalled that a second stage machine does not build the band but merely shapes it into the belt and tread assembly. Referring first to FIG. 34 it will be seen that the expanding bead lock shaper simply utilizes two expanding rings 405 and 406 which may expand into the beads of a carcass 407 as seen in FIG. 27. The carcass is slipped over the collapsed bead locks which are then expanded into engagement with the inner diameter of the beads. The tire may be inflated for shaping as the bead locks move toward each other. Alternatively, a special shaping bladder may be employed therebetween.

Referring now to FIG. 27 it will be seen that the belt and tread assembly is already built upon the drum 83. The operator may then start the automatic cycle causing the carrier to shift to the left over the drum 83. The transfer ring then closes clamping the belt and tread assembly. At such time the arm assembly 171 is in the clear position seen at 400 so that the operator as soon as the cycle starts may load the carcass 407 onto the shaping drum.

Figure 28:
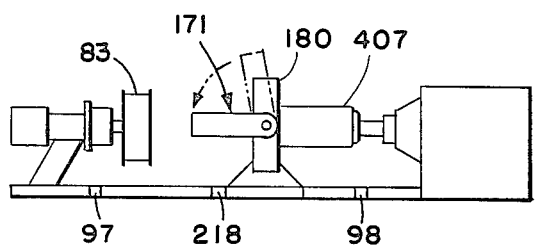

In FIG. 28, the belt drum collapses and the carrier now shifts to the right. The bead locks expand locking the carcass on the drum. When the carrier is clear of the belt drum 83, the arm assembly 171 begins to pivot counterclockwise as shown to its horizontal support position. At this point the carcass is preinflated and the bead locks begin to traverse toward each other. At this point the operator may begin to construct the next belt and tread assembly on drum 83.

Figure 29:
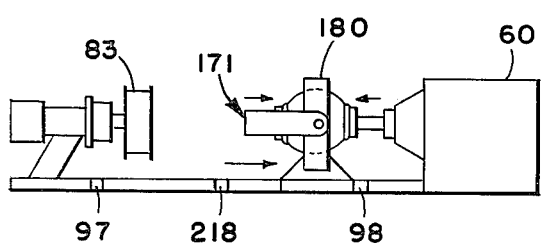

As seen in FIG. 29, the carrier now moves into its position against the stop 98 so that the transfer ring 180 is centered. At this point the shaft is supported for concentricity and squareness. The bead locks continue to traverse toward each other toward such centerline and the carcass is inflated shaping the carcass up into the belt and tread assembly held by the transfer. The operator continues to build up the next belt and tread assembly.

Figure 30:
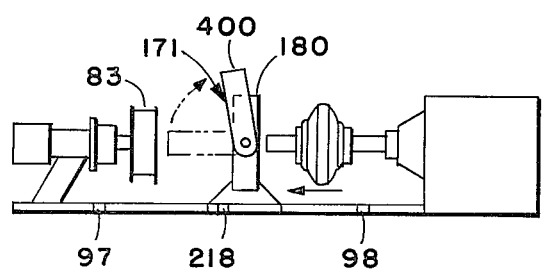

As seen in FIG. 30, when the carcass is fully shaped into the belt and tread assembly, the transfer ring may then release or open and the transfer carriage now shifts to the left to disengage the drum shaft. The arm assembly begins to pivot clockwise to its opposite support position as seen in FIG. 31 as the carrier continues to move to the left.

Figure 31:
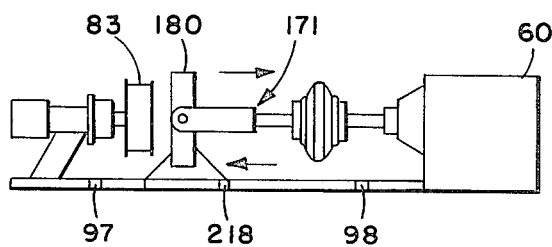

As seen in FIG. 31, when the arm assembly is clear of the belt drum, the carrier continues to shift to the left and when the carrier has shifted to a position to allow the arm to clear the carcass drum shaft, the support arm continues to pivot down to its horizontal support position. When in such position the carrier then shifts to the right engaging the support arm with the drum shaft. At this point the stitching cycle begins stitching the belt and tread assembly to the carcass.

As seen in FIG. 32, when the stitching cycle is complete, the carrier now shifts to the left to disengage the carcass drum shaft support arm and it now starts to pivot counterclockwise to clear the shaped carcass.

In FIG. 33, when the support arm assembly is clear of the carcass, the carrier now shifts to the right to the tire removal position seen with the arm in its clear position 400. In such tire removal position against the stop 98 the transfer closes clamping the carcass. At this point the bead locks are collapsed and begin to traverse outwardly to the start position. At this point the operator has completed the assembly of the second belt and tread assembly.

As seen in FIG. 34, the carrier continues to shift to the left removing the tire from the carcass drum and stops with the tire over the tire removal device 109. The operator then opens the transfer ring, the tire is removed, and the cycle repeats.

In the embodiments of FIG. 27–34, neither the bead setter nor the flange removal device need be employed on the arm assembly 171. The carrier simply functions as a tire removal device, transfer, and a two-position shaft support.

SECOND STAGE MACHINE UTILIZING SLEEVELESS METALLIC SHAPER

The machine illustrated in FIGS. 35–42 corresponds generally to the machine shown in FIG. 4 and illustrated in some detail in the embodiment of FIGS. 11, 12 and 13.

Figure 35:
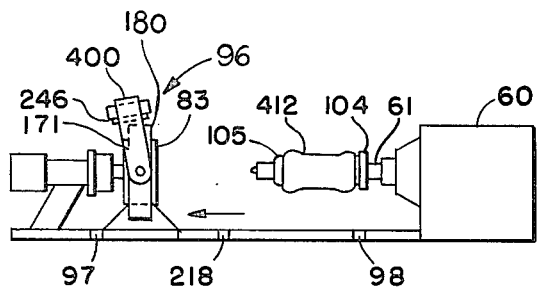
FIGS. 35-42 are a similar series of schematic sequence diagrams illustrating the present invention as a second stage radial tire building machine utilizing a sleeveless metallic flange shaper.

Referring first to FIG. 35 it will be seen that the belt and tread assembly is already built upon the belt drum 83. Upon the commencement of the cycle the carrier shifts to the left over the belt drum and the transfer ring closes clamping the belt and tread assembly. In such position, the arm assembly is in clear position 400 and includes secured thereto detached bead seal ring 246. With the outboard assembly 105 disassembled, the operator may readily load the carcass 412 on the shaper.

Figure 36:
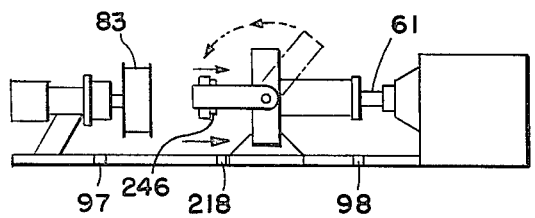

Referring to FIG. 36, the automatic cycle starts with the belt drum collapsing. The carrier then shifts to the right and when it is clear of the belt drum, the arm assembly 171 begins to pivot counterclockwise to its horizontal support position. The carrier moves beyond retracted stop 218. The carrier shifts to the right engaging the support arm 171 with the shaper shaft 61. At this point the operator may begin to construct the next belt and tread assembly.

Figure 37:
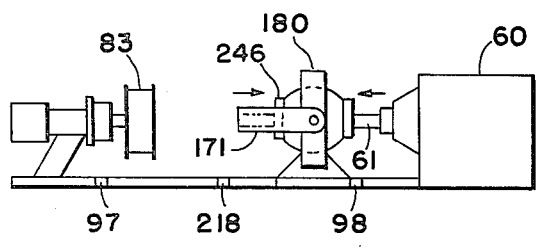

As seen in FIG. 37, when the carrier is in position over the carcass, the outboard bead seal ring cylinders are actuated engaging the bead seal ring assembly with the outboard shaper flange 105 as seen more clearly in FIG. 13. At this point the locking cylinder assemblies 305 retract locking the ring assembly 246 in position. The cylinder assemblies 276 extend moving the frame to the position seen in FIG. 12 leaving the bead seal ring 246 on the carcass shaper flange 105. The two flange assemblies 104 and 105 now traverse each other at the same speed while the carcass is inflated shaping the carcass up into the belt and tread assembly held by the carrier transfer ring 180. All during the assembly and shaping operation, the shaft 61 is supported for concentricity and squareness.

Figure 38:
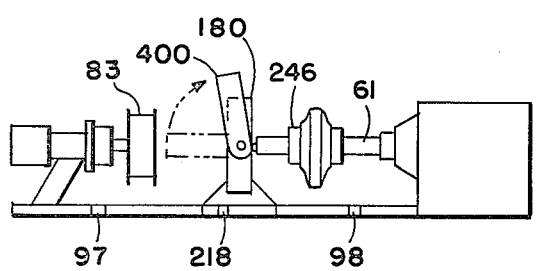

With reference to FIG. 38, when the carcass 412 is fully shaped into the belt and tread assembly, the transfer ring opens releasing the belt and tread assembly. The carrier now shifts to the left to disengage the shaper shaft 61. The arm assembly begins to pivot in a clockwise direction to its opposite horizontal support position.

Figure 39:
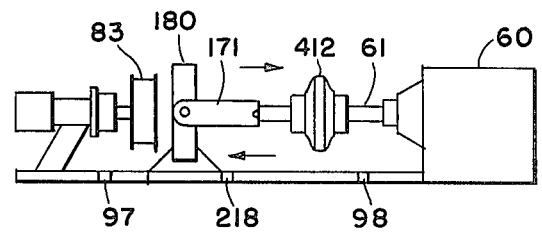

As seen in FIG. 39, when the arm 171 is clear of the belt drum, the carrier continues to shift to the left. When the carrier has shifted to a position to allow the support arm to clear the shaper flange shaft 61, the arm continues to its horizontal position support position. When the arm is in such position the carrier now shifts back to the right engaging the support arm with the shaper shaft and in such position is against the intermediate stop 218. At this point the backstitcher then begins to stitch the tread and belt assembly to the carcass.

Figure 40:
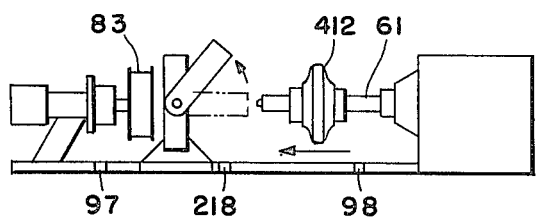

In FIG. 40, when the stitching cycle is completed, the carrier shifts now to the left to disengage the shaper flange shaft 61 and the support arm begins to pivot in a counterclockwise direction to clear the shaped carcass.

Figure 41:
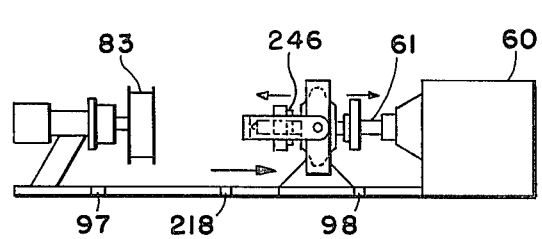

In FIG. 41, the intermediate stop 218 has been retracted and when the arm 171 is clear of the carcass, the carrier shifts to the right to its carcass pick-up position against the stop 98. At the same time the arm pivots to its opposite horizontal position and simultaneously supports the carcass shaft. In such position the transfer ring closes clamping the carcass. Also, the outboard bead seal ring cylinders are actuated to move the frame 260 inwardly to engage and disassemble the bead seal ring 246 from the outboard flange. At this point the carcass is deflated and the bead seal ring 246 is retracted from the outboard shaper flange 105. The carrier now shifts to the left and the shaper flanges begin to traverse outwardly or away from each other. At this point the operator has completed construction of the next belt and tread assembly.

Figure 42:
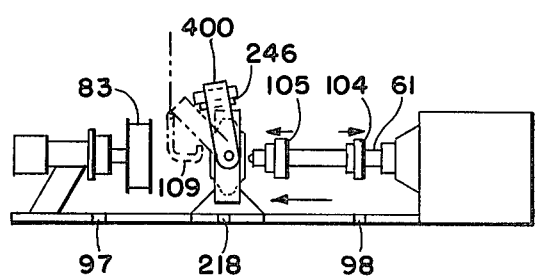

As seen in FIG. 42, when the arm is clear of the shaper flange shaft, the arm pivots in a clockwise direction to a clear position 400 which will clear the tire removal device 109. The carrier continues to shift to the left removing the carcass from the shaper flanges and stops with the carcass over the removal device 109. At the same time the shaper flanges traverse out to the start position and stop. The operator opens the transfer to deposit the finished carcass on the tire removal device. The cycle may then commence again.

SECOND STAGE MACHINE WITH SLEEVELESS METALLIC SHAPER—FIGS. 43–50

In the modification of FIGS. 43–50 a sleeveless metallic shaper is employed as in FIG. 4 and the modification of FIGS. 35–42. However, unlike the sequence just described above, no separate belt and tread assembly building drum 83 is employed. The belt shuttle servicer 84 seen in FIG. 1 together with the tread stock conveyor 85 will now be positioned in line with the centerline of the shaper.

Figure 43:
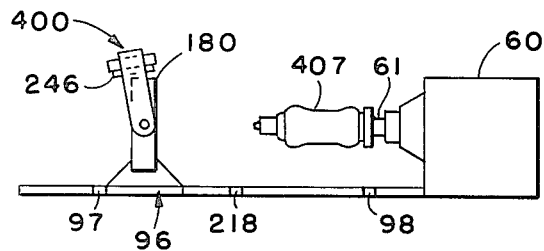

In FIG. 43, the carrier 96 is positioned against the stop 97 and the arm assembly 171 has possession of the sealing ring 246 in the clear position 400 shown. The operator loads the carcass 412 onto the flanges of the shaper and starts the automatic cycle.

Figure 44:
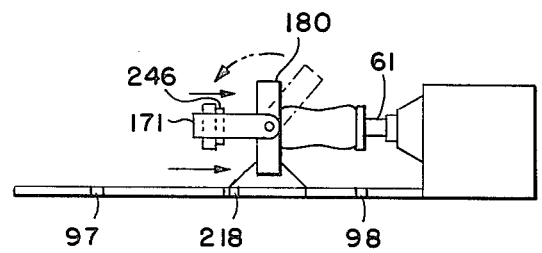

As seen in FIG. 44, the arm 171 pivots in a counterclockwise direction to its horizontal support position with the carrier shifting to the right engaging the support arm with the shaper flange shaft 61.

Figure 45:
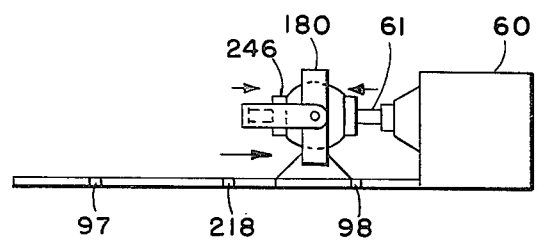

When the shaft is engaged and supported as in FIG. 45, the carrier is now in a position over the carcass and the outboard seal ring is assembled with the flange 105. When the seal ring is locked in position, the cylinders 276 are extended to retract the frame 260. At this point the shaping flanges traverse inwardly synchronously and the carcass is inflated shaping the carcass.

Figure 46:
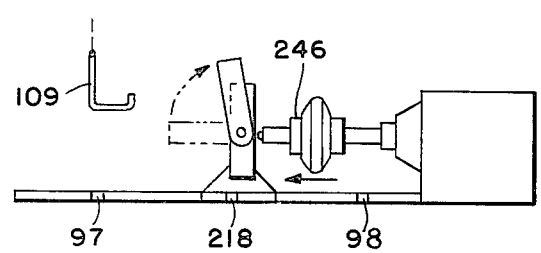

As seen in FIG. 46, while the carcass is being shaped, the carrier now shifts to the left. When the support arm 171 is disengaged from the shaper shaft, the arm begins to pivot in a clockwise direction to its opposite support position.

Figure 47:
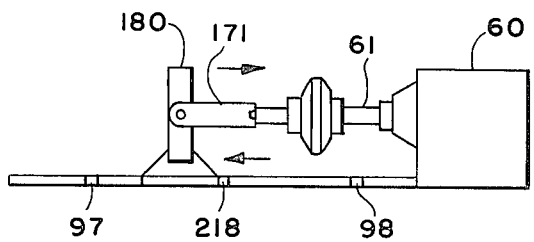

As seen in FIG. 47, when the carrier has shifted to a position to allow the arm to clear the shaper shaft 61, the support arm continues to its horizontal position and the carrier now shifts back to the right engaging the now extended intermediate stop 218 and in such position the arm engages the distal end of the shaper shaft. The operator may now apply the belts and tread directly to the carcass. When the tread construction on the carcass is completed the operator initiates the stitching cycle and the backstitcher automatically stitches the belt and tread to the carcass. At this point the operator may reload the tread conveyor or applicator.

Figure 48:
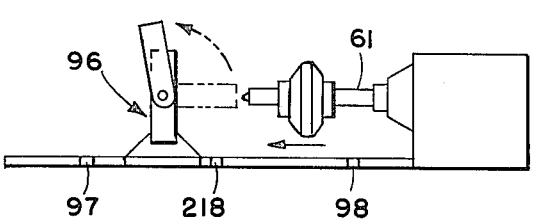

As seen in FIG. 48, when the stitching cycle is complete, the carrier now shifts to the left to disengage the shaper shaft 61. The arm now pivots counterclockwise to clear the tire.

Figure 49:
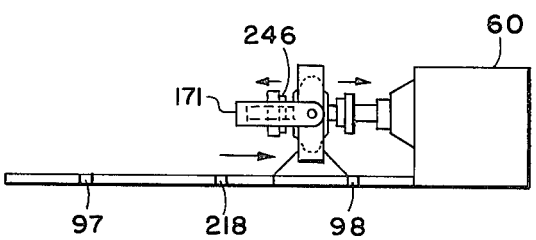

As indicated in FIG. 49, when the support arm 171 is clear of the carcass, the carrier shifts to the right past the now retracted intermediate stop 218 to the carcass pick-up position shown. In such position the transfer ring is centered around the tread portion of the carcass and the ring closes clamping the same. At this point, the outboard cylinder assemblied 276 retract to engage the bead seal ring assembly. The bead seal locking cylinders extend unlocking the bead seal ring from the carcass outboard shaper flange assembly 105. At this point the tire has deflated and the outboard bead seal ring cylinders then extend retracting the disassembled bead seal flange 246 as indicated in FIG. 12. The carrier now shifts to the left and the flange assemblies 105 and 104 move apart or traverse outwardly.

Figure 50:
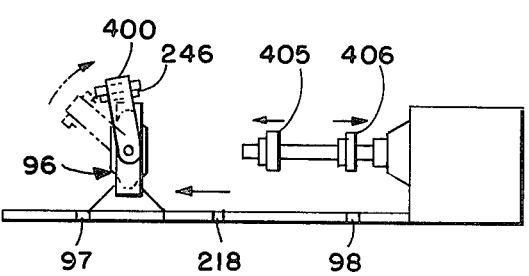

As indicated in FIG. 50, when the arm is clear of the shaper shaft 61, the support arm pivots in a clockwise direction to a position which will clear the tire removal device such as the hook 109. This may be the clearance position indicated at 400. The carrier continues to shift to the left removing the carcass from the shaper flanges and stops with the tire over the tire removal device. At this time the shaper flanges have traversed outwardly to the start position and stop. The operator then opens the transfer ring and removes the tire. The machine components are then back to the position seen in FIG. 1 and the next tire carcass may be loaded and the cycle repeated.

SECOND STAGE MACHINE WITH EXPANDING BEAD LOCK SHAPER—FIGS. 51-55

Referring first to FIG. 5 it will be seen that the shaft 61 supports expanding bead locks 405 and 406 in the same manner as shown in FIG. 34. However, an axially aligned belt and tread assembly building machine is not employed.

Figure 51:
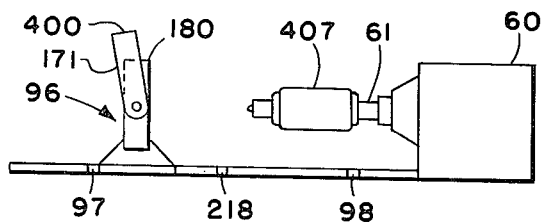

As seen in FIG. 51, the belt servicer and tread applicator will be in line with the shaper and both are loaded with stock. The operator then places the carcass 407 onto the bead lock rings and starts the automatic cycle.

Figure 52:
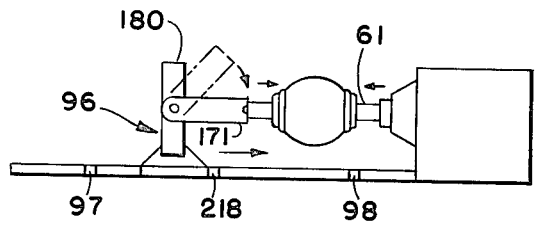

As seen in FIG. 52, the arm assembly 171 pivots clockwise to a horizontal support position and the carrier shifts to the right engaging the support arm with the carcass drum shaft. At this point the bead locks expand locking the carcass to the shaper and the carcass is then inflated and the bead locks begin to traverse symmetrically toward each other to the position shown.

Figure 53:
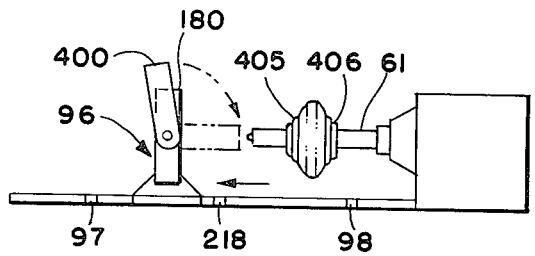

In FIG. 53 the carcass is inflated and the bead locks have treaversed in fully to the shaped position. The drum now rotates or spots automatically for the application of the belt material and the tread stock by the operator. When the belt and tread application is complete, the tread is automatically stitched. When the stitch cycle is complete the carrier now shifts to the left to disengage the support arm from the shaft and the arm pivots counterclockwise to clear the carcass.

Figure 54:
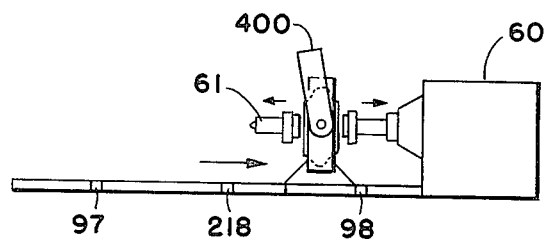

As seen in FIG. 54, when the arm is clear of the carcass again in the position 400, the carrier may then shift to the right to the tire pick-up position against the stop 98. The transfer ring then clamps the tire about the tread, the carcass is deflated and the bead locks are collapsed and begin to traverse outwardly.

Figure 55:
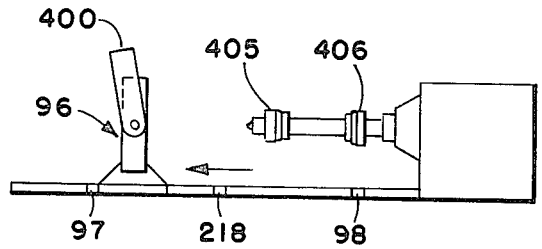

Finally, in FIG. 55, the bead locks have continued to traverse outwardly to their start position and the carrier has shifted left against the stop 97 which is the tire removal position. The tire may be removed by the hook 109 in the same manner as previously indicated. At this point the cycle is completed and the next carcass may be loaded as seen in FIG. 51.

It will be appreciated that the modular packages of FIGS. 43-50 and 51-55 may equally well be employed in retreading with the bead locks or flanges not being required to move for shaping, but merely inflation. Also, the tread may be applied by strip winding while the tire is inflated and the shaft supported.

While there have been illustrated and described a number of modular arrangements of the components of the present invention, it will be appreciated that others, not illustrated or described, may equally well be employed. For example, the carrier may be used to support the shaft of a first stage machine with the transfer removing the flat band carcass thus constructed.

It can now be seen that applicant has provided a tire building machine, the components of which can be arranged in a variety of ways to produce tires by either a single stage, second stage or first stage process. The principal component of the machine is the carrier cooperating with the drum or shaper and which has a wide variety of functions such as transfer, tire removal, bead setting, or flange assembly and disassembly, but in each case also importantly as a support or journal for the distal or outboard end of the machine shaft ensuring the required concentricity and squareness for accurate tire construction. In some modifications, it may thus support the shaft in two different positions.

Other modes of applying the principles of the invention may be employed, change being made as regards the details described, provided the features stated in any of the following claims or the equivalent of such be employed.

The embodiments of the invention in which an exclusive property or privilege is claimed are defined as follows:

1. A tire building machine comprising a tire building drum mounted on a shaft, a carrier movable axially of said shaft and including a ring in a plane normal to the axis of said shaft and concentric therewith, an arm secured to said ring, and means to swing said arm from a shaft alignment position to a clear position to clear the interior of said ring for movement of said carrier axially of said shaft.

2. A tire building machine as set forth in claim 1 wherein said means to swing said arm includes means to pivot said arm 180° and to selected positions therebetween.

3. A tire building machine as set forth in claim 2 wherein said arm is secured to said ring at a point on a horizontal diameter thereof.

4. A tire building machine as set forth in claim 3 wherein said arm is U-shaped and is pivoted at its ends to said ring on said horizontal diameter thereof.

5. A tire building machine as set forth in claim 4 wherein the bight portion of said arm includes a journal for said shaft.

6. A tire building machine as set forth in claim 5 wherein said journal supports said shaft for rotation in two positions of said journal.

7. A tire building machine as set forth in claim 6 wherein said journal is open-ended and will support an end of said shaft for concentricity and squareness from either open end.

8. A tire building machine as set forth in claim 1 including a bead setter on said arm, and means mounting said bead setter on said arm for omnidirectional adjustment to obtain concentricity and squareness with said shaft in one position of said arm.

9. A tire building machine as set forth in claim 8 wherein said bead setter is mounted on a ring having a spherical surface, a frame supporting said ring and having a conical surface mating with said spherical surface, and adjustment means interconnecting said ring and frame to obtain both squareness and concentricity of said ring with said shaft.

10. A tire building machine as set forth in claim 1 wherein said drum includes a shaping flange, and a flange remover mounted on said arm operative to remove and replace said flange in one position of said arm.

11. A tire building machine as set forth in claim 10 wherein said flange remover includes an actuator, operative in one condition to lock said flange to said drum and in another condition to lock said flange to said flange remover.

12. A tire building machine as set forth in claim 11 including means mounting said flange remover on said arm to obtain concentricity and squareness with the axis of said shaft.

13. A tire building machine comprising a tire building and shaping drum and a belt building drum, a belt transfer mounted for movement between said drums, an intermediate stop for said transfer, and support means mounted on said transfer operative to support the shaft of said tire building and shaping drum when said transfer is in engagement with said stop.

14. A tire building machine as set forth in claim 13 wherein said intermediate stop is retractable.

15. A tire building machine as set forth in claim 14 wherein the position of the intermediate stop is adjustable.

16. A tire building machine as set forth in claim 13 including means to remove said support means from the path of travel of said transfer in either direction.

17. A tire building machine as set forth in claim 13 including adjustable end stops at each end of travel of said transfer, said support means also being operative to support said shaft when against one of said end stops.

18. A tire building machine as set forth in claim 13 wherein said transfer is in the form of a ring, and said support comprises an arm diametrically pivoted to said ring.

19. A tire building machine as set forth in claim 18 wherein said arm is U-shaped and pivoted at both ends to said ring.

20. A tire building machine as set forth in claim 19 wherein the bight portion of said arm includes an open ended journal operative to support the shaft from either end.

21. A tire building machine as set forth in claim 13 including a bead setter on said support.

22. A tire building machine as set forth in claim 13 wherein said drum includes a removable shaping flange, and a flange remover on said support.

23. A tire building machine as set forth in claim 13 wherein said support comprises an arm pivoted to said transfer, and motor means operative to pivot said arm from axial to opposite axial alignment with the shaft and positions therebetween.

24. A tire building machine comprising a shaft driven for controlled rotation at one end, and an idle journal for said shaft at the other end, and mounting means for said idle journal for movement thereof axially of said shaft and arcuately transversely of the axis of said shaft, said mounting means comprising a transfer for a tire component movable axially of said shaft.

25. A tire building machine as set forth in claim 24 wherein said transfer includes an idle journal support hinged thereto to move said journal through an arc intersecting the axis of said shaft.

26. A tire building machine as set forth in claim 25 wherein said support is hinged on a horizontal axis to said transfer and said journal moves arcuately transversely of said shaft in a vertical plane.

27. A tire building machine as set forth in claim 26 including stop means to hold said support in a horizontal plane.

28. A tire building machine as set forth in claim 27 including motor means to move said support between said stop means and to positions therebetween.

29. A tire building machine as set forth in claim 25 including a bead setter mounted on support for omnidirectional adjustment to obtain concentricity and squareness with said shaft in one position of said support.

30. A tire building machine as set forth in claim 25 including a shaping flange on said shaft, and a flange remover mounted on said support operative to remove and replace said flange in one position of said support.

31. A tire building machine as set forth in claim 30 wherein said flange remover comprises a chuck operative to release the flange from the shaft and secure it to said flange remover and vice versa.

32. A tire building machine as set forth in claim 30 wherein said flange includes a pivoting latch, and said remover includes an actuator for said latch.

33. A tire building machine as set forth in claim 32 including two positions for said latch, one securing the flange to the shaft and the other securing the flange to the remover while releasing it from the shaft and vice versa.

34. A tire building machine comprising a shaft driven for controlled rotation at one end, and a carrier at the other end of said shaft movable axially of said shaft operative to support said shaft at two axial positions of said carrier.

35. A tire building machine as set forth in claim 34 wherein said carrier comprises a transfer, and an arm pivoted to said transfer and operative to support said shaft in two pivotal positions thereof.

36. A tire building machine as set forth in claim 34 wherein said shaft is supported for concentricity and squareness in both positions and optionally for rotation in either position.

37. A tire building machine as set forth in claim 36 wherein said shaft is supported in an open ended journal.

38. A tire building machine comprising a shaft driven at one end and adapted to be idly supported at the other end, a carrier mounted for movement parallel to the axis of said shaft, and a movable support on said carrier, said support in one position rotatably supporting said shaft at said other end, and in another position being clear of said shaft to enable said carrier to be moved axially of said shaft.

39. A tire building machine as set forth in claim 38 wherein said carrier is a tire removal device, and said support in its clear position enables said carrier to move to its tire pick-up position.

40. A tire building machine as set forth in claim 38 wherein said carrier comprises a tire component transfer ring, said support being pivoted to said ring.

41. A tire building machine as set forth in claim 40 including means operative to pivot said support 180°.

42. A tire building machine as set forth in claim 40 including means operative to pivot said support 180° and to positions therebetween.

43. A tire building machine comprising a tire shaper and a carriage, support means for moving the carriage axially of said tire shaper to transfer tires or tire components to or from such shaper, adjustable positive end stops for said carriage, and positive intermediate stop means for said carriage operative positively to position said carriage intermediate said end stops in a position to support said shaper.

44. A machine as set forth in claim 43 wherein said intermediate stop is retractable.

45. A machine as set forth in claim 44 including an adjustable projection on said carriage, and guide means mounting said retractable intermediate stop for movement to and from an abutment position in the path of said projection.

46. A machine as set forth in claim 45 wherein said projection is part of an adjustable stop on said carriage.

47. A tire building machine comprising inboard and outboard tire bead sealing flanges movable uniformly toward and away from each other to seal and inflate a tire therebetween, said outboard flange comprising two separable parts, one of which may be removed from the other to permit a tire to be positioned on and removed from the machine, the improvement comprising a carrier movable toward and away from the outboard flange, said carrier including means to release said one part from the other and secure it to the carrier and vice versa.

48. A tire building machine as set forth in claim 47 wherein said carrier comprises a transfer for tires or tire components.

49. A tire building machine as set forth in claim 48 wherein said last mentioned means is supported on an arm pivoted to said transfer.

50. A tire building machine as set forth in claim 49 including means to pivot said arm to and from a position clear of the path of movement of said transfer.

51. In a tire shaping and building machine having a two part outboard sealing flange, a carrier operative to disassemble one of said two parts and move it clear of the other to permit a tire to be removed from the machine and a new tire placed thereon.

52. A tire building machine as set forth in claim 51 wherein said carrier is operative to replace said one part at the beginning of the automatic cycle of the machine.

53. A tire building machine as set forth in claim 52 wherein said carrier comprises a transfer for tires or tire components.

54. In a tire building machine, a bead setter operative axially to place a bead in the proper axial and squareness position with respect to a tire to be built, a support for said bead setter, said support including a ring movable axially of the tire to set the bead, and means mounting said bead setter on said ring for limited transaxial and axial directional adjustment to obtain concentricity and squareness with the axis of the tire.

55. A tire building machine as set forth in claim 54 including a carrier for said bead setter operative to move the same axially of the tire.

56. A tire building machine as set forth in claim 55 wherein said carrier comprises a transfer for tires or tire components.

57. In a tire building machine, a bead setter operative axially to place a bead in the proper axial and squareness position with respect to a tire to be built, a support for said bead setter, said support including a ring movable axially of the tire to set the bead, means mounting said bead setter on said ring for omnidirectional adjustment to obtain concentricity and squareness with the axis of the tire, a carrier for said bead setter operative to move the same axially of the tire, said carrier comprising a transfer for tires or tire components, and an arm pivoted to said transfer on which said bead setter is mounted.

58. A tire building machine as set forth in claim 57 wherein said machine comprises a shaft, and means on said arm operative to engage and support said shaft when the bead setter is operational.

59. In a tire building machine, a flange remover operative to remove and replace a tire supporting flange of a tire building machine. a support for said flange remover, said support including a frame movable axially of the flange, and means on said frame operative to engage said flange and lock the same to said frame for movement therewith, and vice versa.

60. A tire building machine as set forth in claim 59 wherein said last mentioned means also includes means to release said flange from the tire building machine and vice versa.

61. In a tire building machine, a bead setter, means operative axially to move said bead setter when in axial alignment with the tire to be built, said bead setter including bead gripping fingers, and actuators for said fingers operative to move said fingers axially of the tire and also axially to rotate said fingers when thus axially moved.

62. A tire building machine as set forth in claim 61 wherein said actuators comprise a piston-cylinder assembly, the rod of which axially rotates as it moves axially.

63. In a tire building machine, a bead setter movable axially of a tire to be built to place a bead in proper position, a carrier for said bead setter, means to move said carrier axially of the tire, said carrier in at least one axial position thereof including means to hold the axis of the tire in precise squareness and concentricity with the bead.

64. A tire building machine as set forth in claim 63 including an arm pivoted to said carrier supporting said bead setter for movement transversely of the axis of the tire.

65. A tire building machine as set forth in claim 64 including means on said arm supporting said bead setter for omnidirectional adjustment to obtain precise squareness and concentricity with the axis of the tire.

66. In a tire building machine, a drum, a tire supporting flange on said drum a flange remover for said flange, means mounting said flange remover for movement axially of the tire to be built, and means mounting said flange remover for movement transversely of the axis of the tire.

67. In a tire building machine, a flange remover, means mounting said flange remover for movement axially of the tire to be built, and means mounting said flange remover for movement transversely of the axis of the tire, said flange remover being mounted on a transfer for tires or tire components, said last mentioned means being operative to move said flange remover clear of the path of the transfer.

68. A tire building machine as set forth in claim 67 wherein said flange remover is mounted on an arm pivoted to said transfer.

* * * * *